(12) United States Patent
Takase

(10) Patent No.: US 12,464,080 B2
(45) Date of Patent: Nov. 4, 2025

(54) READING DEVICE AND CONTROL METHOD FOR READING DEVICE

(71) Applicant: SEIKO EPSON CORPORATION, Tokyo (JP)

(72) Inventor: Yuji Takase, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/527,536

(22) Filed: Dec. 4, 2023

(65) Prior Publication Data
US 2024/0195924 A1    Jun. 13, 2024

(30) Foreign Application Priority Data

Dec. 7, 2022 (JP) .................................. 2022-195524

(51) Int. Cl.
*H04N 1/00* (2006.01)

(52) U.S. Cl.
CPC ..... *H04N 1/00517* (2013.01); *H04N 1/00087* (2013.01); *H04N 1/00411* (2013.01); *H04N 1/00427* (2013.01); *H04N 1/00514* (2013.01); *H04N 2201/0094* (2013.01)

(58) Field of Classification Search
CPC ........... H04N 1/00517; H04N 1/00087; H04N 1/00411; H04N 1/00427; H04N 1/00514; H04N 2201/0094; H04N 1/00482; H04N 1/00082; H04N 1/00408; H04N 1/00798; H04N 1/00891

See application file for complete search history.

(56) References Cited

U.S. PATENT DOCUMENTS

| | | | | |
|---|---|---|---|---|
| 2007/0252824 A1* | 11/2007 | Okada | ................... | G06F 3/0219 345/173 |
| 2008/0131182 A1* | 6/2008 | Okajima | ................ | G06K 15/02 400/76 |
| 2011/0302630 A1* | 12/2011 | Nair | ........................ | G06F 21/31 726/4 |
| 2015/0350269 A1* | 12/2015 | Shibata | ................. | G06F 3/0483 715/202 |
| 2020/0344369 A1* | 10/2020 | Okumura | ........... | H04N 1/00474 |
| 2020/0374411 A1* | 11/2020 | Takase | ............... | H04N 1/00482 |

FOREIGN PATENT DOCUMENTS

JP    2020-191540 A    11/2020

* cited by examiner

*Primary Examiner* — Iriana Cruz
(74) *Attorney, Agent, or Firm* — WORKMAN NYDEGGER

(57) ABSTRACT

A reading device causes a display unit to display, as an initial screen, any one of a processing function selection screen displaying a plurality of processing functions, a processing function execution screen for executing one of the plurality of processing functions, and a favorite selection screen displaying a plurality of favorites, in an initial mode setting screen on which the initial screen displayed when the reading device enters a standby state in which an operation is received from a user is set.

21 Claims, 15 Drawing Sheets

| PAGE NUMBER | PROCESSING FUNCTION NUMBER | PROCESSING FUNCTION |
|---|---|---|
| 1 | 1 | SCAN TO DRIVE FUNCTION |
| 1 | 2 | SCAN TO CLOUD FUNCTION |
| 1 | 3 | SCAN TO COMPUTER FUNCTION |
| 2 | 4 | ... |
| 2 | 5 | ... |
| 2 | 6 | ... |
| 3 | 7 | ... |
| 3 | 8 | ... |
| 3 | 9 | ... |

| PROCESSING FUNCTION | PRIORITY INFORMATION |
|---|---|
| SCAN TO CLOUD FUNCTION | 1 |
| SCAN TO DRIVE FUNCTION | — |
| SCAN TO COMPUTER FUNCTION | — |
| SCAN TO MAIL FUNCTION | — |
| SCAN TO FOLDER FUNCTION | — |
| ... | — |
| ... | — |

| PROCESSING FUNCTION | FIRST PRIORITY INFORMATION - FIRST POSITION INFORMATION | SECOND PRIORITY INFORMATION - SECOND POSITION INFORMATION |
|---|---|---|
| SCAN TO CLOUD FUNCTION | 1 | 2 |
| SCAN TO DRIVE FUNCTION | 2 | 4 |
| SCAN TO COMPUTER FUNCTION | — | — |
| SCAN TO MAIL FUNCTION | 3 | 3 |
| SCAN TO FOLDER FUNCTION | — | 1 |
| ... | — | — |
| ... | — | — |

FIG. 29

READING DEVICE AND CONTROL METHOD FOR READING DEVICE

BACKGROUND

The present application is based on, and claims priority from JP Application Serial Number 2022-195524, filed Dec. 7, 2022, the disclosure of which is hereby incorporated by reference herein in its entirety.

1. Technical Field

The present disclosure relates to a reading device and a control method for the reading device.

2. Related Art

JP-A-2020-191540 describes a reading device that reads an image of a document. The reading device includes a display unit that displays a favorite selection screen that displays, as a favorite, reading settings arbitrarily set by a user. A user can call desired reading settings by selecting a favorite from the favorite selection screen.

In the reading device described in JP-A-2020-191540, it is necessary to call the favorite selection screen in order to select a favorite. It is also necessary to call screens other than the favorite selection screen, for users who do not use favorites. Therefore, there is room for improvement in usability.

SUMMARY

A reading device for solving the above problems is a reading device configured to register a reading setting as a favorite, the reading device including:
a display unit, and a control unit configured to control the display unit,
wherein the display unit is configured to display an initial mode setting screen for setting an initial screen displayed when the reading device enters a standby state in which an operation from a user is waited for, a processing function selection screen on which a plurality of processing functions are displayed, a processing function execution screen for executing one of the plurality of processing functions, a favorite selection screen on which a plurality of favorites are displayed, and the control unit receives a setting for displaying any one of the processing function selection screen, the processing function execution screen, and the favorite selection screen as the initial screen on the initial mode setting screen, and causes the display unit to display the screen received on the initial mode setting screen as the initial screen.

A control method for a reading device that solves the above problem is a control method for a reading device configured to register a reading setting as a favorite, the control method for a reading device including: receiving a setting for displaying, as an initial screen, any one of a processing function selection screen displaying a plurality of processing functions, a processing function execution screen for executing one of the plurality of processing functions, and a favorite selection screen displaying a plurality of favorites, in an initial mode setting screen on which the initial screen displayed when the reading device enters a standby state in which an operation is received from a user is set, and displaying the screen received on the initial mode setting screen as the initial screen.

BRIEF DESCRIPTION OF THE DRAWINGS

FIG. 29 is a table illustrating priority information associated with position information.

DESCRIPTION OF EMBODIMENTS

Hereinafter, an embodiment of a reading device will be described with reference to the drawings. A reading device is, for example, a scanner that reads a document such as a paper or film. The reading device may be included in, for example, a multifunctional machine including a printing device that prints an image on a medium, and a facsimile machine that transmits image data of a document read by the reading device.

Reading Device

Figure 1:
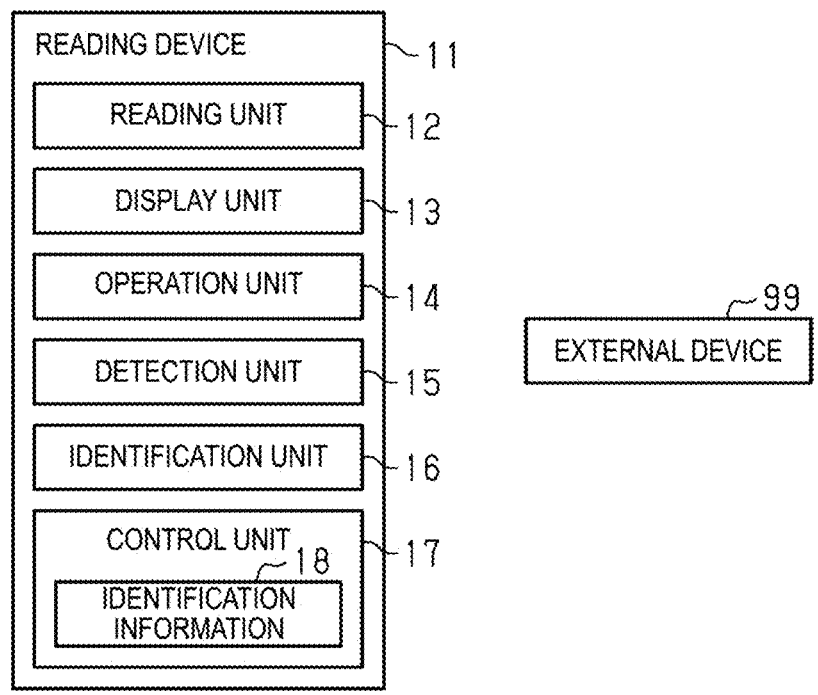
FIG. 1 is a block diagram illustrating an embodiment of a reading device.

As illustrated in FIG. 1, a reading device 11 may be configured to communicate with an external device 99. The external device 99 is, for example, a personal computer, a smartphone, or the like owned by a user. The reading device 11 may receive instructions from the user through the external device 99. The external device 99 may have an application for communicating with the reading device 11.

The reading device 11 includes a reading unit 12. The reading unit 12 is configured to read a document. The reading unit 12 includes, for example, a CMOS image sensor. The reading unit 12 outputs a signal by photoelectrically converting light reflected from the document.

The reading device 11 includes a display unit 13. The display unit 13 is configured to display various screens. The display unit 13 is, for example, a liquid crystal display. Screens displayed by the display unit 13 will be described below.

The reading device 11 includes an operating unit 14. The user operates the reading device 11 through the operating unit 14. The user causes the reading device 11 to read the document by operating the operating unit 14. The user operates the operating unit 14 while viewing the screen displayed by the display unit 13. The user switches between the screens displayed by the display unit 13 by operating the operating unit 14. The operating unit 14 is, for example, a touch panel. The operating unit 14 may be a switch, lever, button, or the like.

The reading device 11 may include a detection unit 15. The detection unit 15 is configured to detect positioning information regarding a position of the reading device 11. The detection unit 15 detects the positioning information of the reading device 11 by receiving signals from GPS satellites.

The reading device 11 may include an identification unit 16. The identification unit 16 is configured to identify the user. The identification unit 16 identifies the user who currently uses the reading device 11. The identification unit 16 may include, for example, a communication circuit that identifies the user based on communication from the external device 99. In this case, the identification unit 16 identifies the user based on, for example, a number assigned to each external device 99, such as an IP address. The identification unit 16 may identify the user based on an individual number of a communication application of the external device 99. The identification unit 16 may include, for example, a card reader externally coupled to the reading device 11. In this case, the identification unit 16 identifies the user by communicating with an IC card owned by the user. The identification unit 16 identifies the user so that the reading device 11 ascertains the user.

The reading device 11 includes a control unit 17. The control unit 17 may be configured of one or more processors that execute various processes according to a computer program. The control unit 17 may be configured of one or more dedicated hardware circuits such as an ASIC that executes at least some of the various processes. The control unit 17 may be configured of a circuit including a combination of a processor and hardware circuits. The processor includes a CPU, and memory such as RAM and ROM. The memory stores program code or instructions configured to cause the CPU to execute processes. The memory, that is, computer-readable medium includes any readable medium that can be accessed by a general purpose or special purpose computer.

The control unit 17 controls various components included in the reading device 11. The control unit 17 acquires image data of the document from the reading unit 12 by controlling the reading unit 12. The control unit 17 acquires the image data by converting a signal output from the reading unit 12.

The control unit 17 may transmit the positioning information detected by the detection unit 15 to a server. The server has map information. The server can ascertain position information indicating the position of the reading device 11 based on the positioning information and the map information. The server transmits the position information to the reading device 11. The control unit 17 acquires the position information. Thereby, the reading device 11 ascertains an installation position. For example, the control unit 17 ascertains whether the reading device 11 is installed in a residential area or in a company based on the position information.

The control unit 17 may store user information indicating the user who uses the reading device 11. The control unit 17 may store the user information in advance, or may newly store the user information when the identification unit 16 identifies a new user. When the identification unit 16 identifies the new user, the control unit 17 may cause the display unit 13 to display a screen for asking the user whether or not to store the user information. The control unit 17 may store the user information in association with identification information 18. The identification information 18 is information displayed on the display unit 13. The identification information 18 is stored in the control unit 17 in advance. In this case, the user can ascertain the user who is currently using the reading device 11 by viewing the display unit 13.

The control unit 17 controls the screen displayed by the display unit 13 by controlling the display unit 13. The control unit 17 causes the display unit 13 to display the screen by executing a program stored in the memory. The control unit 17 switches the screens displayed by the display unit 13 by receiving an operation from the operating unit 14. The control unit 17 switches between the screen displayed by the display unit 13 according to a state of the reading device 11.

The control unit 17 causes the display unit 13 to display the initial screen when the reading device 11 transitions to the standby state. The initial screen is a screen displayed by the display unit 13 when the reading device 11 enters the standby state. The standby state is a state in which the reading device 11 waits for an operation from the user.

The control unit 17 may cause the display unit 13 to display the initial screen when transition from an operating state to the standby state occurs. The operating state is a state in which the reading device 11 is receiving the operation from the user. When the operating unit 14 receives an operation in the standby state, the reading device 11 transitions to the operating state. The reading device 11 transitions to the standby state when no new operation is performed within a predetermined time in the operating state. This is so-called timeout. That is, the control unit 17 causes the display unit 13 to display the initial screen upon timeout.

The control unit 17 may cause the display unit 13 to display the initial screen when transition from a sleep state to the standby state occurs. The sleep state is a state in which the display unit 13 is turned off in order to save power. The reading device 11 transitions to the sleep state when no operation is performed within a predetermined time in the standby state. When the reading device 11 receives an operation through the external device 99 or the operating unit 14 in the sleep state, the reading device 11 transitions to the standby state. In this case, the control unit 17 causes the display unit 13 to display the initial screen.

The control unit 17 may cause the display unit 13 to display the initial screen after the reading device 11 is powered on. The reading device 11 starts a startup operation when the power is turned on. When the startup operation is completed, the reading device 11 transitions to the standby state. In this case, the control unit 17 causes the display unit 13 to display the initial screen.

The control unit 17 may cause the display unit 13 to display the initial screen when transition from an identification state to the standby state occurs. The identification state is a state of waiting for identification of the user by the identification unit 16. In this case, the reading device 11 may transition to the identification state after timeout, after return from the sleep state, after the startup operation is completed, or the like. When the identification unit 16 identifies the user, the reading device 11 transitions from the identification state to the standby state. That is, after the control unit 17 identifies the user, the control unit 17 causes the display unit 13 to display the initial screen.

Screen and Control

Next, screens displayed by the display unit 13 and control in the control unit 17 according to the display will be described.

Figure 2:
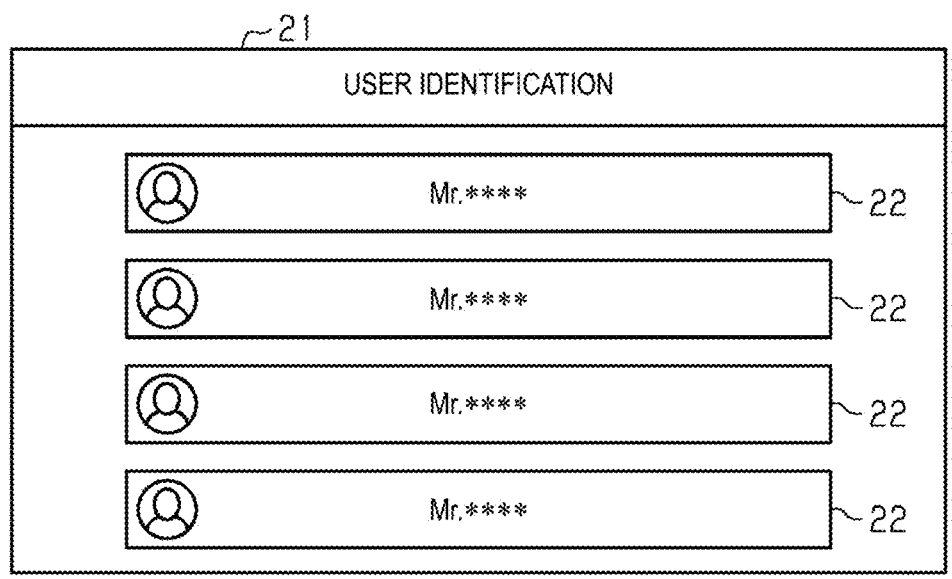
FIG. 2 is a schematic diagram of a user identification screen.

As illustrated in FIG. 2, the display unit 13 may display a user identification screen 21. The user identification screen 21 is a screen for identifying the user. The user identification screen 21 is displayed in the identification state.

One or more user selection buttons 22 may be displayed on the user identification screen 21. When the user selection button 22 is selected, the control unit 17 ascertains that the user corresponding to the user selection button 22 uses the reading device 11. A message requesting the identification of the user by the identification unit 16 may be displayed on the user identification screen 21. For example, a message requesting authentication by an IC card may be displayed on the user identification screen 21. When the user is identified, the user identification screen 21 is switched to the initial screen.

When the user is identified, the identification information 18 may be displayed on the screen displayed by the display unit 13. In one example, the identification information 18 is a color assigned to each user. For example, color of icons displayed on the initial screen, background color of the initial screen, and the like may be different for each user. In not only the initial screen but also other screens, the icon color, the background color, and the like may be different for each user. This allows the user to ascertain a current user by visually recognizing the colors on the screen. The identification information 18 is not limited to the color, and may be an icon indicating the user or may be a name indicating the user. The identification information 18 may be always displayed in the standby state, the operating state, and the like.

Figures 3, 4:
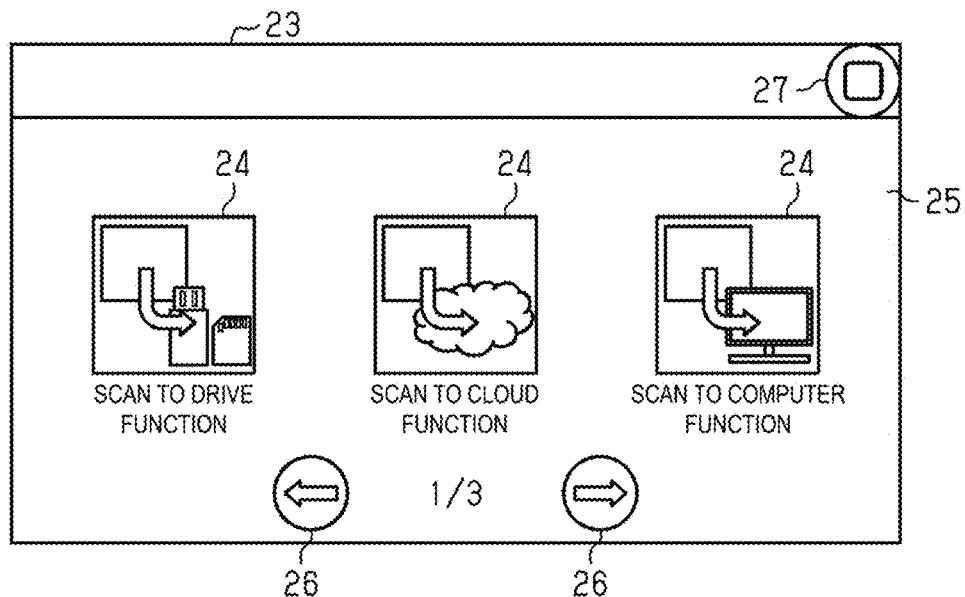
FIG. 3 is a schematic diagram of a processing function selection screen.
FIG. 4 is a table illustrating a correspondence between a processing function number and a processing function.

As illustrated in FIG. 3, the display unit 13 displays the processing function selection screen 23. The processing function selection screen 23 is a screen on which a plurality of processing functions are displayed. On the processing function selection screen 23, one processing function can be selected from the plurality of processing functions. The processing function indicates a process that the reading device 11 can execute. A plurality of processing function icons 24 indicating processing functions are displayed on the processing function selection screen 23.

In one example, the processing functions include a scan to cloud function, a scan to folder function, a scan to drive function, a scan to computer function, a scan to mail function, and the like. The scan to cloud function is a function of transmitting image data to a cloud. The scan to folder function is a function of sending image data to a folder. The scan to drive function is a function of transmitting image data to a storage device coupled to the reading device 11. The storage device is a USB memory, an SD card, or the like. The storage device is directly coupled to the reading device 11. The scan to computer function is a function of transmitting image data to a computer. The scan to email function is a function of transmitting image data to a specified address by e-mail.

A setting function icon may be displayed on the processing function selection screen 23. The setting function icon is an icon for displaying a screen for setting various items regarding the reading device 11. The setting function icon may be displayed side by side with the processing function icon 24 on the processing function selection screen 23.

The processing function selection screen 23 may include a plurality of pages. In one example, processing function selection screen 23 includes a plurality of switching pages 25. The processing function selection screen 23 includes, for example, three switching pages 25. The processing function selection screen 23 can display one or more processing function icons 24 for each switching page 25. The processing function selection screen 23 can display, for example, three processing function icons 24 for each switching page 25. Accordingly, one or more of the plurality of processing functions are displayed on each of the plurality of switching pages 25 on the processing function selection screen 23.

A switching button 26 is displayed on the processing function selection screen 23. The switching page 25 is switched on the processing function selection screen 23 by the switching button 26 being operated. In the processing function selection screen 23, a page may be switched not only by the switching button 26 but also by tabs, for example.

The user can customize the processing function icon 24 on the processing function selection screen 23. For example, the user can add the processing function icon 24, change the position of the processing function icon 24, or delete the processing function icon 24 in the processing function selection screen 23. The control unit 17 stores the position of the processing function icon 24 in the processing function selection screen 23. Further, the user may be able to customize pages on the processing function selection screen 23. For example, the user may be able to add pages or delete pages.

As illustrated in FIG. 4, the control unit 17 stores the processing function number and the processing function in association with each other. The processing function number is a number indicating a position at which the processing function icon 24 is displayed on the processing function selection screen 23. The processing function number is associated with the page number of the processing function selection screen 23. For example, the three processing function icons 24 indicating processing functions having processing function numbers 1, 2, and 3 are displayed on a first page of the processing function selection screen 23.

Thus, the control unit 17 manages the display of the processing function icons 24 by assigning numbers to the processing functions.

As illustrated in FIG. 3, a setting button 27 may be displayed on the processing function selection screen 23. The setting button 27 is a button for setting a currently displayed screen as the initial screen. When the setting button 27 is operated on the processing function selection screen 23, the control unit 17 receives a setting for displaying the processing function selection screen 23 as the initial screen. That is, in this case, when the reading device 11 transitions to the standby state, the processing function selection screen 23 is displayed as the initial screen. This improves usability for users who frequently use the processing function selection screen 23. The initial screen may be set with the page number of the processing function selection screen 23. In this case, when the setting button 27 is operated in a state in which a second page of the processing function selection screen 23 is displayed, the control unit 17 receives a setting for displaying the second page of the processing function selection screen 23 as the initial screen.

Figure 5:
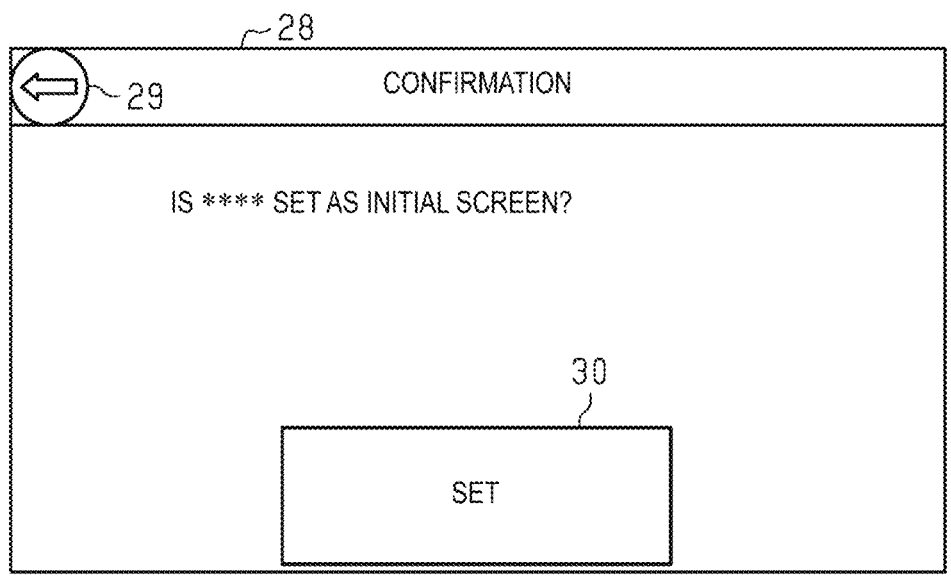
FIG. 5 is a schematic diagram of a setting confirmation screen.

As illustrated in FIG. 5, the display unit 13 may display a setting confirmation screen 28. The setting confirmation screen 28 is a screen for prompting confirmation of the setting of the initial screen. For example, when the setting button 27 is operated on the processing function selection screen 23, the setting confirmation screen 28 is displayed. A return button 29 may be displayed on the setting confirmation screen 28. The return button 29 is a button for return to a previous screen. An OK button 30 is displayed on the setting confirmation screen 28. When the OK button 30 is operated on the setting confirmation screen 28, the setting of the initial screen is completed.

Figure 6:
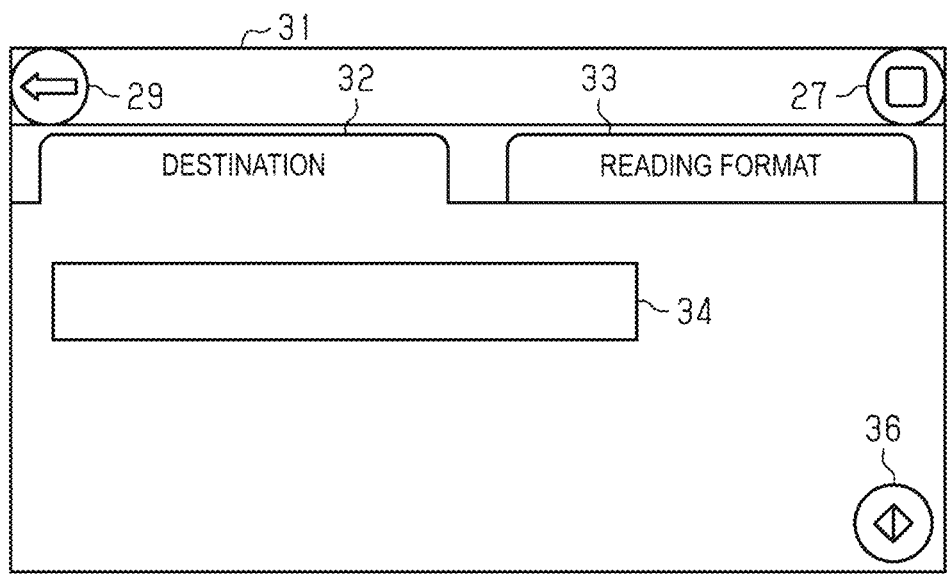
FIG. 6 is a schematic diagram of a destination page on a processing function execution screen.

As illustrated in FIG. 6, the display unit 13 displays a processing function execution screen 31. The processing function execution screen 31 is a screen for executing a processing function. Specifically, the processing function execution screen 31 is a screen for executing one of the plurality of processing functions that are executable by the reading device 11. The processing function execution screen 31 may have different content for each processing function.

The processing function execution screen 31 is displayed by selecting the processing function icon 24 on the processing function selection screen 23. When the processing function icon 24 indicating the scan to cloud function is selected, the processing function execution screen 31 for the scan to cloud function is displayed. When the processing function icon 24 indicating the scan to drive function is selected, the processing function execution screen 31 for the scan to drive function is displayed.

The processing function execution screen 31 includes one or more setting pages. The setting page includes, for example, a destination page 32 and a reading format page 33. The setting page is a page for determining settings regarding to the reading. On the processing function execution screen 31, the destination page 32 and a reading format page 33 are switched by selecting a tab. The switching button 26 may be displayed on the processing function execution screen 31. The setting page may be switched by operating the switching button 26.

In the destination page 32, a destination of the image data is set. In the destination page 32, a destination field 34 in which the destination of the image data is set is displayed. For example, when a processing function indicating the scan to cloud function is selected, one or a plurality of destinations that can be designated in the cloud may be displayed in the destination field 34. In the destination field 34, an address for designating a destination can be directly input.

Figure 7:
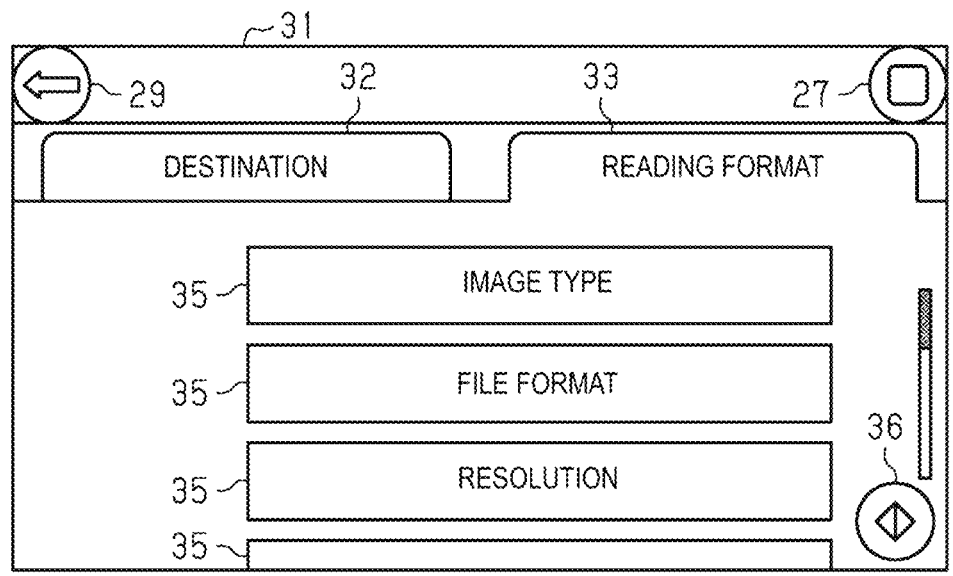
FIG. 7 is a schematic diagram of a reading format page on the processing function execution screen.

As illustrated in FIG. 7, the reading format is set on the reading format page 33. The reading format is, for example, an image type, file format, and resolution. The image type is an item indicating a reading scale of the document, such as full color, monochrome, or gray. The file format is an item indicating an extension such as PDF or TIFF. The resolution is an item indicating reading resolution of the document. A format column 35 in which the reading format is set is displayed on the reading format page 33. The reading format page 33 may be displayed so as to be scrollable up and down.

A start button 36 is displayed on the processing function execution screen 31. In one example, the start button 36 is displayed on both the destination page 32 and the reading format page 33. When the start button 36 is operated, reading of the document is started with current settings.

The setting button 27 may be displayed on the processing function execution screen 31. When the setting button 27 is operated on the processing function execution screen 31, the control unit 17 receives a setting for displaying the processing function execution screen 31 as the initial screen. That is, in this case, when the reading device 11 transitions to the standby state, the processing function execution screen 31 is displayed as the initial screen. This improves usability for users who frequently use the processing function execution screen 31. The return button 29 may be displayed on the processing function execution screen 31. When the return button 29 is operated on the processing function execution screen 31, the screen returns to the processing function selection screen 23.

Figure 8:
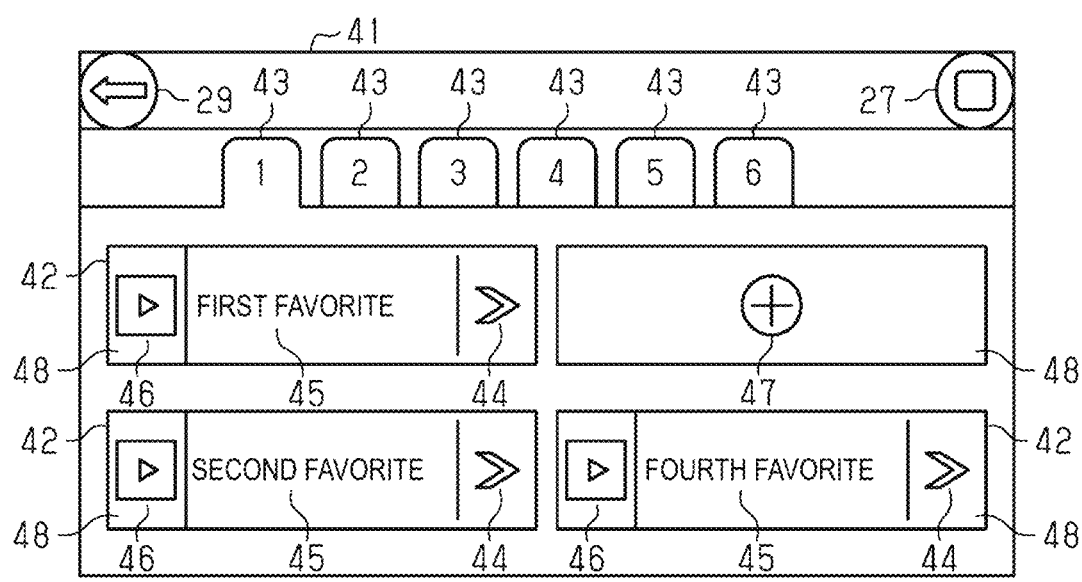
FIG. 8 is a schematic diagram of a favorite selection screen.

As illustrated in FIG. 8, the display unit 13 displays a favorite selection screen 41. The favorite selection screen 41 is a screen on which a plurality of favorites are displayed. One favorite can be selected from the plurality of favorites on the favorite selection screen 41. The favorite is generated by the user registering an arbitrary reading setting. Therefore, the favorite is associated with a predetermined reading setting. The favorite may be generated by the operating unit 14 being operated or may be generated by the control unit 17 receiving an instruction from the external device 99. The reading setting includes settings such as processing functions, destinations, and reading formats. That is, the reading setting includes information indicating one processing function to be used among the plurality of processing functions. The reading setting includes information indicating the destination of the image data. The reading setting includes information indicating the reading format of the document. The favorite selection screen 41 may be transitioned by a hardware switch included in the operating unit 14 being operated, or may be transitioned from the processing function selection screen 23. Therefore, the reading device 11 is configured to be able to register the reading setting as favorites.

A plurality of favorite labels 42 indicating favorites are displayed on the favorite selection screen 41. When the favorite label 42 is operated, a reading setting associated with the favorite is called.

The favorite selection screen 41 may include a plurality of pages. In one example, the favorite selection screen 41 includes a plurality of tab pages 43. The favorite selection screen 41 includes six tab pages 43, for example. The favorite selection screen 41 can display one or more favorite labels 42 on each tab page 43. The favorite selection screen 41 can display four favorite labels 42 on each tab page 43, for example. Therefore, one or more of the plurality of favorites are displayed on the plurality of tab pages 43 in the favorite selection screen 41.

Figures 9, 10:
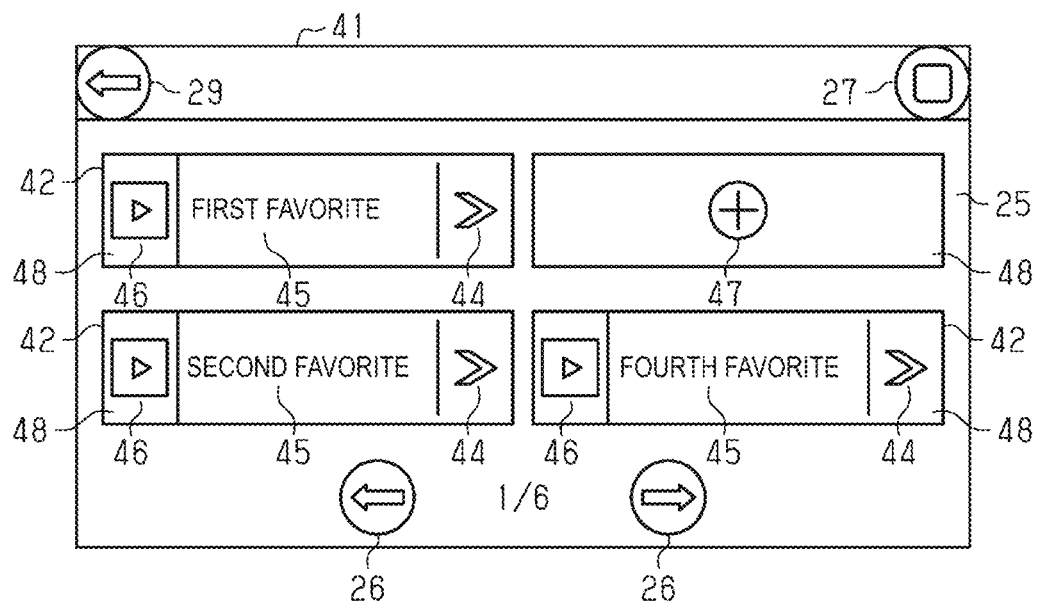
FIG. 9 is a schematic diagram illustrating another example of the favorite selection screen.
FIG. 10 is a table illustrating a correspondence between a favorite number and a favorite.

As illustrated in FIG. 9, on the favorite selection screen 41, the page may be switched by not only tabs, but also by the switching button 26. In this case, the favorite selection screen 41 includes a plurality of switching pages 25. For example, the favorite selection screen 41 includes six switching pages 25. The favorite selection screen 41 can display one or more favorite labels 42 on each switching page 25. For example, the favorite selection screen 41 can display four favorite labels 42 on each switching page 25. Therefore, one or more of the plurality of favorites are displayed on each of the plurality of switching pages 25 in the favorite selection screen 41.

On the favorite selection screen 41, the favorite label 42 can be customized by the user. For example, the user can add the favorite label 42, change the position of the favorite label 42, or delete the favorite label 42 on the favorite selection screen 41. The control unit 17 stores the position of the favorite label 42 in the favorite selection screen 41. Further, the user may be able to customize pages on the favorite selection screen 41. For example, the user may be able to add pages or delete pages.

As illustrated in FIGS. 8 and 9, an edit button 44 may be displayed on the favorite label 42. The favorite corresponding to the favorite label 42 can be edited or deleted by operating the edit button 44. The position of the favorite label 42 may be changed by operating the edit button 44.

A favorite name 45 may be displayed on the favorite label 42. The favorite name 45 is set by the user when the favorite is registered.

A favorite icon 46 may be displayed on the favorite label 42. The favorite icon 46 is set by the user when the favorite is registered.

As illustrated in FIG. 10, the control unit 17 stores favorite numbers and favorites in association with each other. The favorite number is a number indicating a position at which the favorite label 42 is displayed on the favorite selection screen 41. The favorite number is associated with a page number of the favorite selection screen 41. For example, the favorite label 42 indicating favorites with favorite numbers 1, 2, 3, and 4 is displayed on the first page of the favorite selection screen 41. Thus, the control unit 17 manages the display of the favorite label 42 by assigning a number to the favorite. The favorite may include information such as the favorite name 45 and the favorite icon 46, in addition to the reading setting.

The control unit 17 may be configured so that the plurality of favorites can be registered for each user. For example, the control unit 17 may store the favorite number and the favorite in association with each other for each user. The control unit 17 may store the favorites in association with the user information. The control unit 17 may display the favorite selection screen 41 for each user. Thus, a different favorite selection screen 41 can be displayed for each user.

As illustrated in FIGS. 8 and 9, a registration button 47 is displayed on the favorite selection screen 41. The registration button 47 is a button for registering favorites. In one example, the registration button 47 is displayed in a favorite display field 48 in which no favorites are registered. The favorite display field 48 is a field in which the favorite label 42 is displayed.

A plurality of favorite display fields 48 are displayed on the favorite selection screen 41. On the favorite selection screen 41, one or more favorite display fields 48 are displayed in each page. The plurality of favorite display fields 48 are associated with favorite numbers. The favorite label 42 to which a corresponding favorite number is assigned is displayed in the favorite display field 48. For example, on the first page of the favorite selection screen 41, the four favorite display fields 48 can display four favorite labels 42 with favorite numbers 1 to 4, respectively.

The favorite label 42 is displayed in the favorite display field 48 in which the favorite is registered. The favorite label 42 is not displayed in the favorite display field 48 in which no favorite is registered. The registration button 47 is displayed in the favorite display field 48 in which no favorite is registered. Therefore, the user can intuitively designate the position of the favorite label 42 when the favorite is registered. The registration button 47 is not limited to being displayed in the favorite display field 48. When the favorite is registered, the position of the favorite label 42 indicating the favorite may be designated separately.

The setting button 27 may be displayed on the favorite selection screen 41. When the setting button 27 is operated on the favorite selection screen 41, the control unit 17 receives a setting for displaying the favorite selection screen 41 as the initial screen. That is, in this case, when the reading device 11 transitions to the standby state, the favorite selection screen 41 is displayed as the initial screen. This improves usability for users who frequently use the favorite selection screen 41. The initial screen may be set with the page number of the favorite selection screen 41. In this case, when the setting button 27 is operated in a state in which a second page of the favorite selection screen 41 is displayed, the control unit 17 receives a setting for displaying the second page of the favorite selection screen 41 as the initial screen.

The return button 29 may be displayed on the favorite selection screen 41. For example, when the return button 29 is operated on the favorite selection screen 41, the screen returns to the processing function selection screen 23. As illustrated in FIGS. 11, 12, 13, and 14, the display unit 13 displays a favorite registration screen 51. The favorite registration screen 51 is a screen for registering favorites. The favorite registration screen 51 is displayed by the registration button 47 being operated on the favorite selection screen 41.

Figure 11:
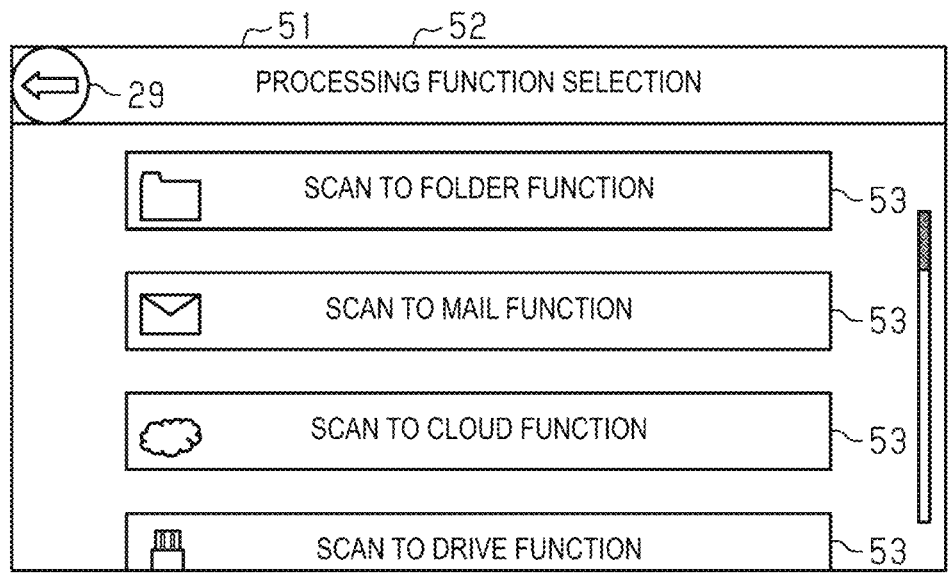
FIG. 11 is a schematic diagram illustrating a function registration screen in a favorite registration screen.

As illustrated in FIG. 11, the favorite registration screen 51 includes a function registration screen 52. The function registration screen 52 is a screen for setting a processing function to be registered in the favorite. A plurality of processing function buttons 53 corresponding to the plurality of processing functions are displayed on the function registration screen 52. The return button 29 may be displayed on the function registration screen 52. When the return button 29 is operated on the function registration screen 52, the screen returns to the favorite selection screen 41.

Figure 12:
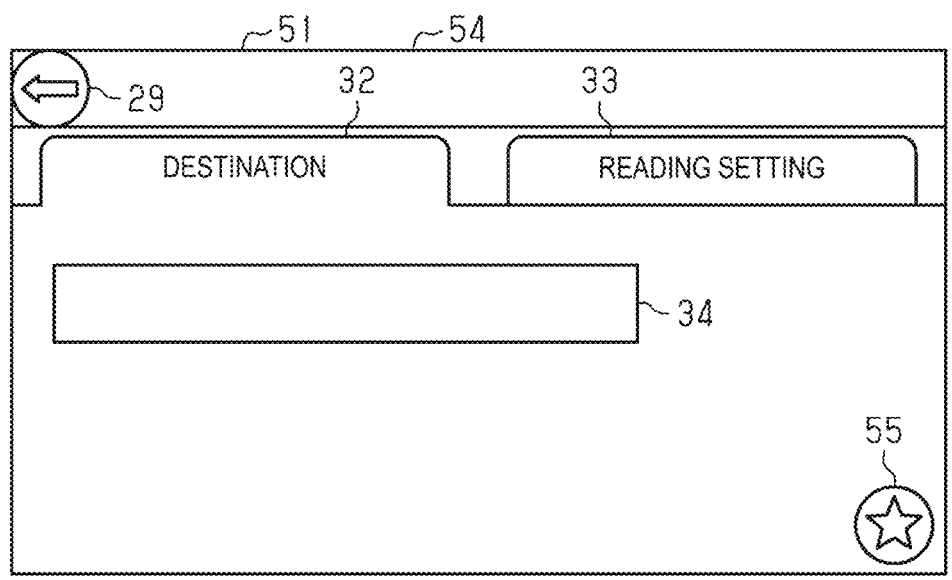
FIG. 12 is a schematic diagram illustrating a destination page in a setting registration screen in the favorite registration screen.
Figure 13:
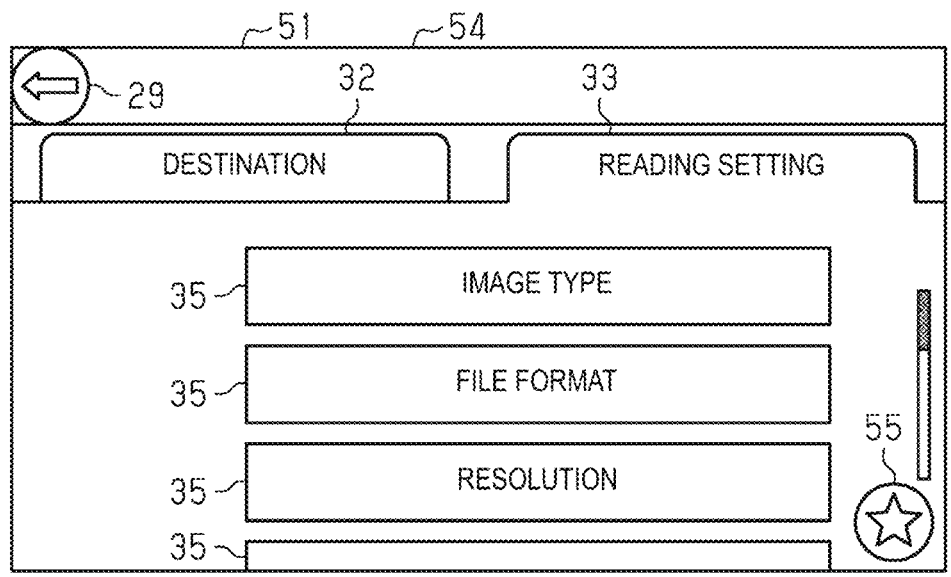
FIG. 13 is a schematic diagram illustrating a reading format page in the setting registration screen in the favorite registration screen.

As illustrated in FIGS. 12 and 13, the favorite registration screen 51 includes a setting registration screen 54. The setting registration screen 54 is a screen for setting destinations and reading formats to be registered in the favorites. The setting registration screen 54 is displayed by the processing function button 53 being selected on the function registration screen 52. The setting registration screen 54 includes one or more setting pages. The setting registration screen 54 includes the destination page 32 and the reading format page 33. The return button 29 may be displayed on the setting registration screen 54. When the return button 29 is operated on the setting registration screen 54, the screen returns to the function registration screen 52.

A completion button 55 is displayed on the setting registration screen 54. When the completion button 55 is operated, the favorite is registered with a current reading setting.

Figure 14:
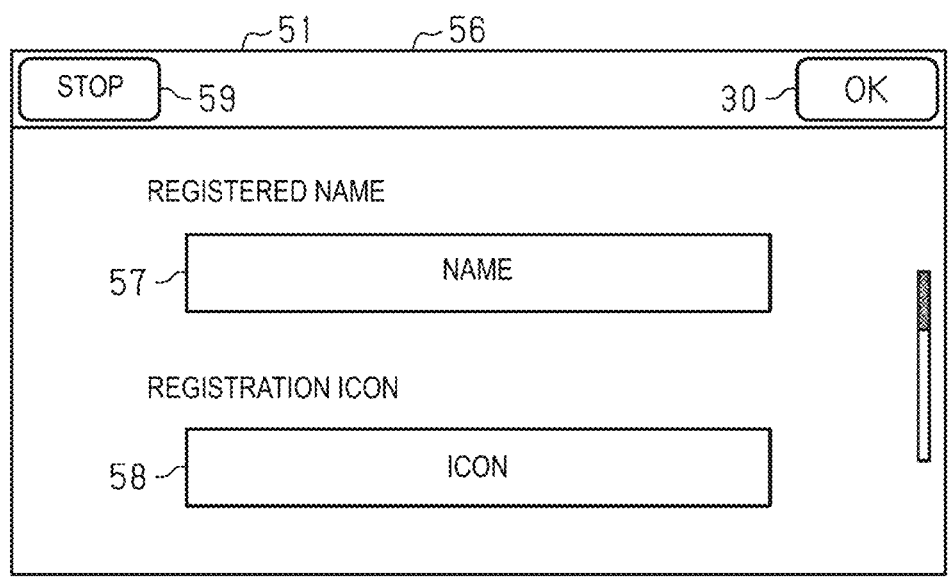
FIG. 14 is a schematic diagram illustrating a display registration screen in the favorite registration screen.

As illustrated in FIG. 14, the favorite registration screen 51 includes a display registration screen 56. The display registration screen 56 is a screen for setting a favorite name 45 and a favorite icon 46 to be registered as favorites. A name input field 57 for registering the favorite name 45 is displayed on the display registration screen 56. An icon input field 58 for registering the favorite icon 46 is displayed on the display registration screen 56.

A stop button 59 may be displayed on the display registration screen 56. When the stop button 59 is operated on the display registration screen 56, the favorite registration is stopped. When the favorite registration is stopped, the screen returns to the favorite selection screen 41.

An OK button 30 is displayed on the display registration screen 56. When the OK button 30 is operated, the set reading setting, the set favorite name 45, and the set favorite icon 46 are registered. That is, the control unit 17 registers favorites. Accordingly, the favorite label 42 indicating the registered favorite is displayed in the favorite display field 48. The control unit 17 may register the favorites by receiving a profile in which the reading setting, the favorite name 45, the favorite icon 46, and the like have been set from the external device 99, as well as registering the favorites through the favorite registration screen 51.

Figure 15:
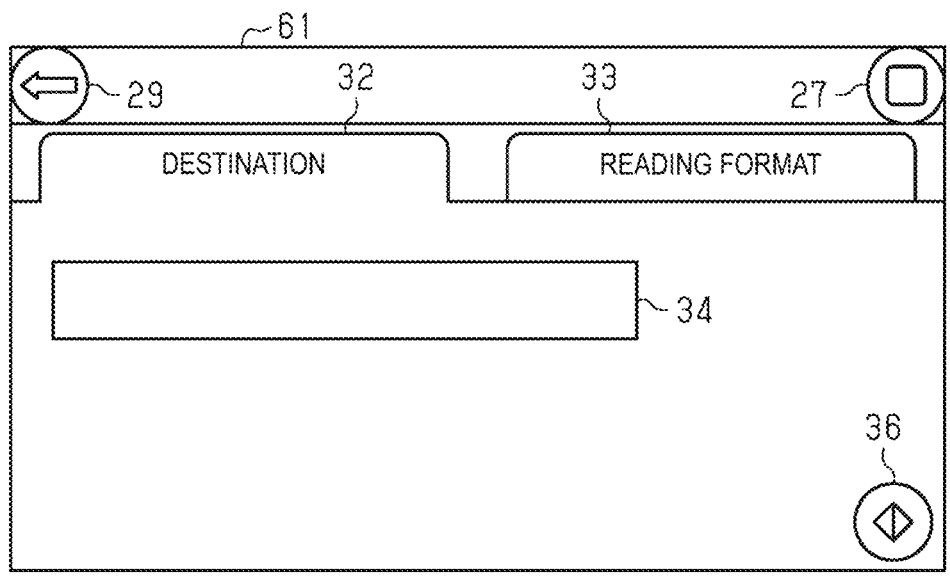
FIG. 15 is a schematic diagram illustrating a destination page on a favorite execution screen.
Figure 16:
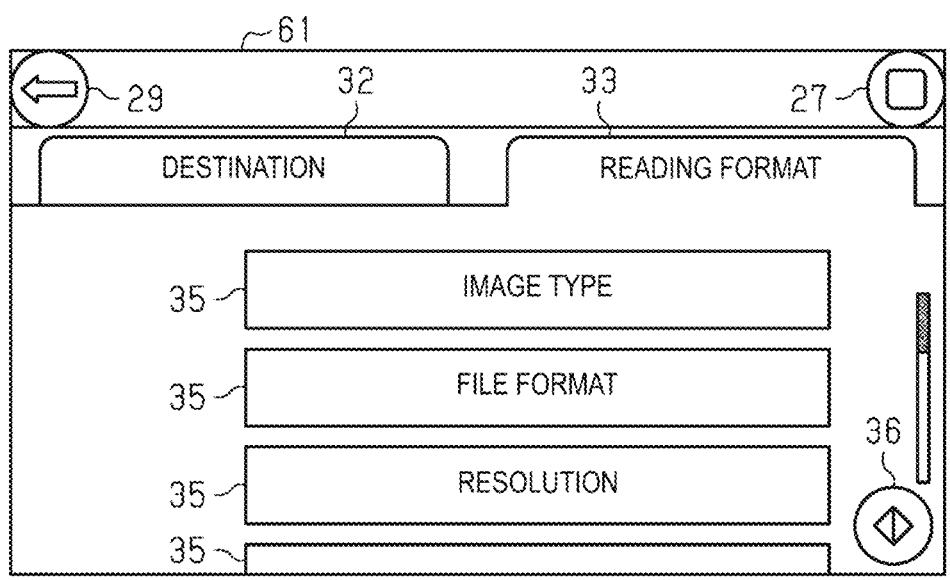
FIG. 16 is a schematic diagram illustrating a reading format page on the favorite execution screen.

As illustrated in FIGS. 15 and 16, the display unit 13 may display the favorite execution screen 61. The favorite execution screen 61 is a screen for executing reading with the reading setting registered in the favorites. The favorite execution screen 61 is a screen in which reading setting corresponding to one favorite among the plurality of favorites are reflected. The favorite execution screen 61 is displayed by the favorite label 42 being selected on the favorite selection screen 41, for example. When the favorite label 42 is selected on the favorite selection screen 41, the control unit 17 may immediately start reading the document without displaying the favorite execution screen 61.

The favorite execution screen 61 is basically the same display as the processing function execution screen 31. The favorite execution screen 61 includes one or more setting pages. In the favorite execution screen 61, settings registered in advance are reflected in the destination page 32 and the reading format page 33.

The start button 36 is displayed on the favorite execution screen 61. When the start button 36 is operated, reading of the document is started with current settings.

The setting button 27 may be displayed on the favorite execution screen 61. When the setting button 27 is operated on the favorite execution screen 61, the control unit 17 receives a setting for displaying the favorite execution screen 61 as the initial screen. That is, in this case, when the reading device 11 transitions to the standby state, the favorite execution screen 61 is displayed. This improves usability for users who frequently use the favorite execution screen 61.

The return button 29 may be displayed on the favorite execution screen 61. For example, when the return button 29 is operated on the favorite execution screen 61, the screen returns to the favorite selection screen 41.

Figure 17:
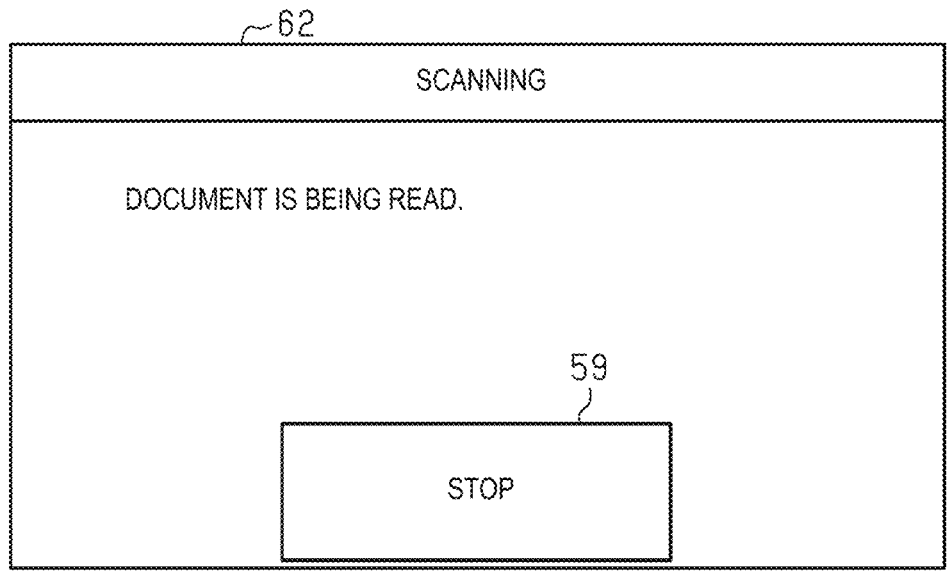
FIG. 17 is a schematic diagram of a reading execution screen.

As illustrated in FIG. 17, the display unit 13 may display a reading execution screen 62. The reading execution screen 62 is a screen indicating that the document is being read. The reading execution screen 62 is displayed by the start button 36 being operated on the processing function execution screen 31, the favorite execution screen 61, or the like. When the reading is completed, the reading device 11 enters the standby state. Therefore, when the reading is completed, the initial screen is displayed.

The stop button 59 may be displayed on the reading execution screen 62. When the stop button 59 is operated on the reading execution screen 62, the reading device 11 stops reading the document. When the reading of the document is stopped, the reading device 11 enters the standby state. Therefore, when the reading of the document is stopped, the initial screen is displayed.

Figure 18:
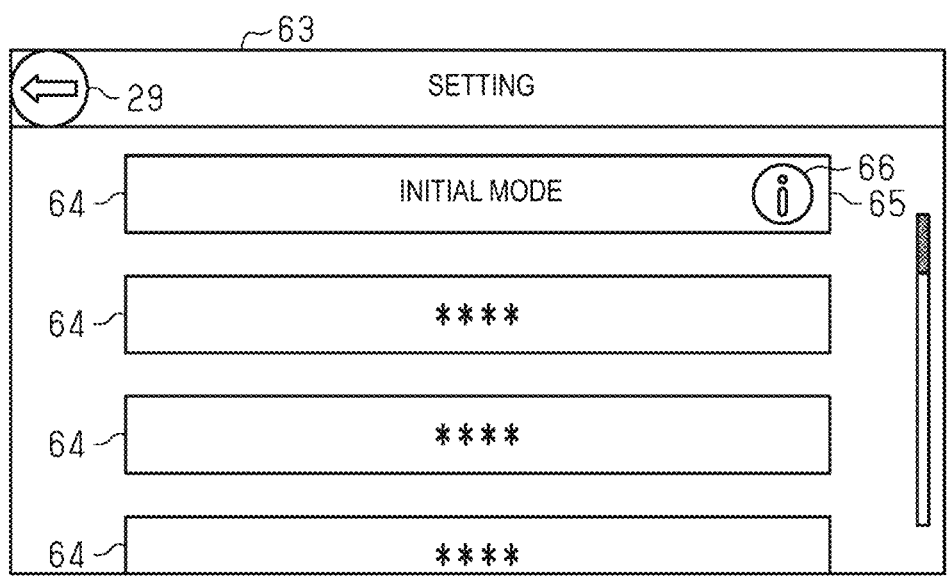
FIG. 18 is a schematic diagram of a setting list screen.

As illustrated in FIG. 18, the display unit 13 displays a setting list screen 63. The setting list screen 63 is a screen for setting various items regarding the reading device 11. The setting list screen 63 is displayed by a setting function icon being selected on the processing function selection screen 23, for example.

One or more setting function buttons 64 are displayed on the setting list screen 63. The one or more setting function buttons 64 include an initial mode button 65 regarding a setting of the initial screen. An annotation icon 66 may be displayed on the initial mode button 65. When the annotation icon 66 is selected, an annotation screen displaying an annotation for the initial mode button 65 may be displayed. The return button 29 may be displayed on the setting list screen 63. When the return button 29 is operated on the setting list screen 63, the screen returns to the processing function selection screen 23.

Figure 19:
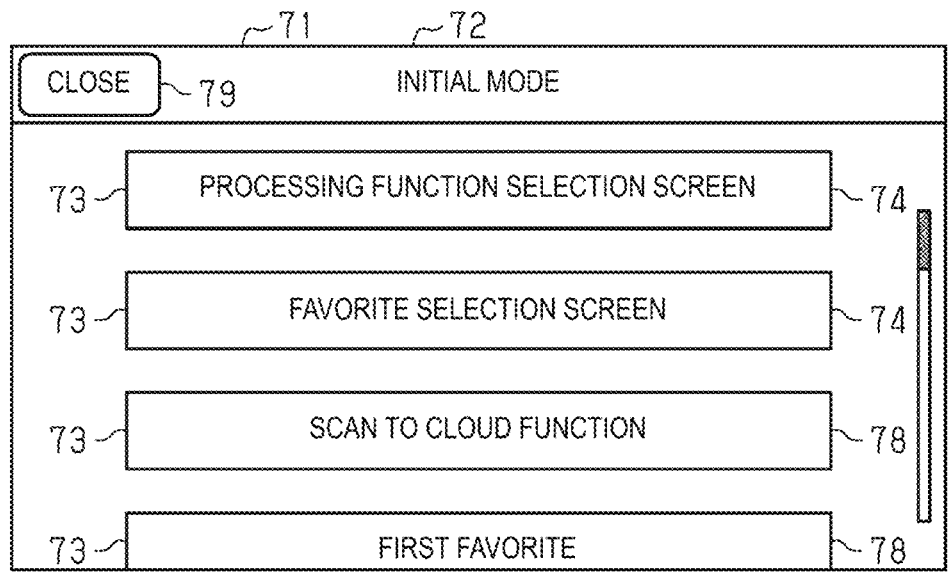
FIG. 19 is a schematic diagram illustrating a function setting screen in an initial mode setting screen.

As illustrated in FIG. 19, the display unit 13 displays an initial mode setting screen 71. The initial mode setting screen 71 is a screen for setting a screen displayed as the initial screen. The initial mode setting screen 71 is displayed by the initial mode button 65 being selected on the setting list screen 63.

Through the initial mode setting screen 71, the control unit 17 receives a setting for displaying an arbitrary screen as the initial screen. The control unit 17 receives a setting for displaying any one of the processing function selection screen 23, the processing function execution screen 31, and the favorite selection screen 41 as the initial screen on the initial mode setting screen 71. That is, the control unit 17 stores information of the screen displayed as the initial screen. The control unit 17 may receive a setting for displaying any one of the processing function selection screen 23, the processing function execution screen 31, the favorite selection screen 41, and the favorite execution screen 61 as the initial screen on the initial mode setting screen 71. When the reading device 11 enters the standby state, the control unit 17 causes the display unit 13 to display the screen received on the initial mode setting screen 71 as the initial screen. This improves usability.

The control unit 17 may receive a setting for displaying any one of the processing function selection screen 23, the processing function execution screen 31, and the favorite selection screen 41 as the initial screen on the initial mode setting screen 71 for each user. That is, the control unit 17 may store information of the screen displayed as the initial screen for each user. For example, the control unit 17 may store the information of the screen displayed as the initial screen in association with the user information. This makes it possible for different initial screens to be set for each user.

The control unit 17 causes the display unit 13 to display the screen received on the initial mode setting screen 71 as the initial screen in the standby state for each user. This makes it possible for different initial screens to be displayed in the standby state for each user.

The initial mode setting screen 71 includes a function setting screen 72. A plurality of corresponding buttons 73 indicating screens that can be set as the initial screen are displayed on the function setting screen 72. The plurality of corresponding buttons 73 include a button corresponding to the processing function selection screen 23, a button corresponding to the processing function execution screen 31, a button corresponding to the favorite selection screen 41, a button corresponding to the favorite execution screen 61, and the like. A screen corresponding to the corresponding button 73 is set as the initial screen by the corresponding button 73 being selected on the function setting screen 72.

The plurality of corresponding buttons 73 may include a screen designation button 74 for designating the screen displayed as the initial screen. When the screen designation button 74 is selected, the screen corresponding to the screen designation button 74 is set as the initial screen. For example, when the screen designation button 74 corresponding to the processing function selection screen 23 is selected, the processing function selection screen 23 is set as the initial screen.

Figure 20:
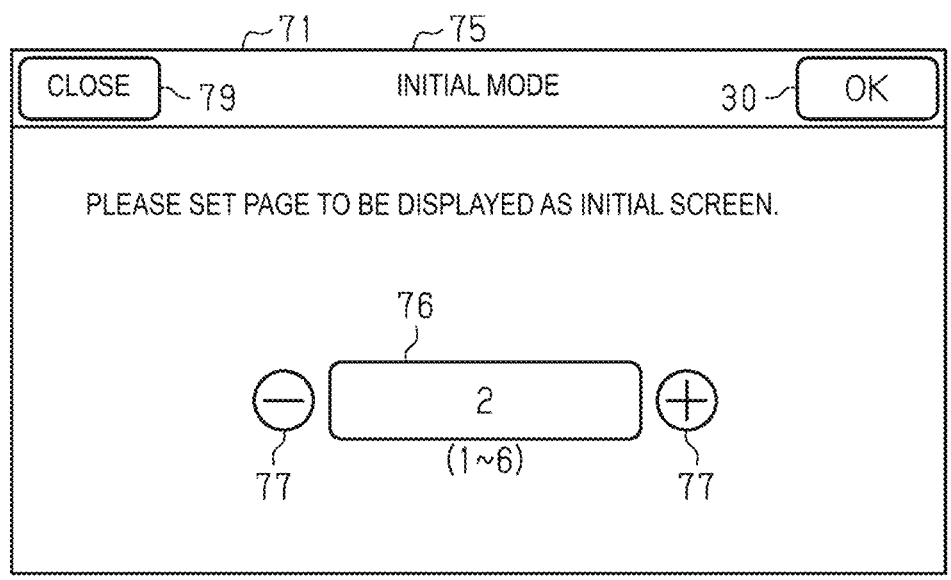
FIG. 20 is a schematic diagram illustrating a page designation screen in the initial mode setting screen.

As illustrated in FIG. 20, the initial mode setting screen 71 may include a page designation screen 75. The page designation screen 75 is a screen for directly designating a page of the screen displayed as the initial screen.

A number-of-pages input field 76 and an increase/decrease button 77, for example, are displayed on the page designation screen 75. The number of pages of the screen set as the initial screen is input to the number-of-pages input field 76. A numerical value displayed in the number-of-pages input field 76 is increased or decreased by the increase/decrease button 77 being operated.

The control unit 17 receives a page number of the screen set as the initial screen on the page designation screen 75. That is, the control unit 17 receives the number of one switching page 25 to be displayed as the initial screen among the plurality of switching pages 25 on the page designation screen 75. The control unit 17 receives the number of one tab page 43 among the plurality of tab pages 43 on the page designation screen 75. Therefore, the page designation screen 75 is a screen for designating the page of the screen displayed as the initial screen based on the page number. The control unit 17 causes the display unit 13 to display the page indicated by the number received on the page designation screen 75 as the initial screen in the standby state.

The page designation screen 75 is displayed by the screen designation button 74 being selected on the function setting screen 72. Specifically, the page designation screen 75 is displayed by the screen designation button 74 corresponding to the processing function selection screen 23 or the favorite selection screen 41 on the function setting screen 72 being selected. When the screen designation button 74 corresponding to the processing function selection screen 23 is selected, the number of pages of the processing function selection screen 23 to be displayed as the initial screen can be designated on the page designation screen 75. When the screen designation button 74 corresponding to the favorite selection screen 41 is selected, the number of pages of the favorite selection screen 41 to be displayed as the initial screen can be designated on the page designation screen 75.

The OK button 30 is displayed on the page designation screen 75. When the OK button 30 is selected on the page designation screen 75, the page with the number displayed in the number-of-pages input field 76 is set as the initial screen.

When the number of the page is received on the page designation screen 75, the control unit 17 may notify the user that no job indicating a processing function or a favorite is displayed on the page with the received number when no job indicating a processing function or a favorite is displayed on the page with the received number. For example, when no processing function is displayed on the switching page 25 with the received number, the control unit 17 notifies the user that no processing function is displayed on the switching page 25. For example, when no favorite is displayed on the tab page 43 with the received number, the control unit 17 notifies the user that no favorite is displayed on the tab page 43. In this case, the control unit 17 may cause the display unit 13 to display a notification screen indicating that no job is displayed on the page with the received number. This reduces concern that a page on which no job is displayed will be set as the initial screen. The job indicates a button for selecting a predetermined processing function on the processing function selection screen 23 and the favorite selection screen 41. That is, the job is the processing function icon 24 displayed on the processing function selection screen 23, the favorite label 42 displayed on the favorite selection screen 41, and the like.

When the number of the page is received on the page designation screen 75 and no job is displayed on the page with the received number, the control unit 17 may notify the user that the page cannot be set as the initial screen. In this case, the control unit 17 may prompt the user to reset the initial screen, or may set another screen as the initial screen.

In the initial mode setting screen 71, the page displayed as the initial screen may be set by a job such as a processing function or a favorite being designated, as well as the page displayed as the initial screen is set by the page number being designated. When the processing function is designated on the initial mode setting screen 71, the page of the processing function selection screen 23 on which the processing function icon 24 corresponding to the processing function is displayed may be set as the initial screen. When the favorite is set on the initial mode setting screen 71, the page of the favorite selection screen 41 on which the favorite label 42 corresponding to the favorite is displayed may be set as the initial screen.

As illustrated in FIG. 19, the plurality of corresponding buttons 73 may include a job designation button 78 for designating a job. The job designation button 78 is a button for designating the page of the screen set as the initial screen based on the job. When the job designation button 78 is selected, the page of the selection screen on which the job corresponding to the job designation button 78 is displayed is set as the initial screen. For example, when the job designation button 78 corresponding to the processing function is selected, the page of the processing function selection screen 23 on which the processing function icon 24 indicating the processing function is displayed is set as the initial screen. For example, when the job designation button 78 corresponding to the favorite is selected, the page of the favorite selection screen 41 on which the favorite label 42 corresponding to the favorite is displayed is set as the initial screen.

When the job designation button 78 is selected, the control unit 17 receives the number of the job corresponding to the job designation button 78. That is, the control unit 17 receives the number of one of the plurality of processing functions on the function setting screen 72. The control unit 17 receives the number of one of the plurality of favorites on the function setting screen 72. For example, when the job designation button 78 corresponding to the processing function is selected, the control unit 17 receives the number of the processing function, that is, the processing function number. For example, when the job designation button 78 corresponding to the favorite is selected, the control unit 17 receives the number of the favorite, that is, the favorite number. In the standby state, the control unit 17 causes the display unit 13 to display a page on which the job indicated by the number received on the function setting screen 72 is displayed, as the initial screen. When the page displayed as the initial screen is designated by the job designation button 78, the page on which the job is displayed can be displayed as the initial screen even when the position of the job is changed, as compared to a case in which the page displayed as the initial screen is designated by the page designation screen 75.

A close button 79 may be displayed on the initial mode setting screen 71. In one example, the close button 79 is displayed on both the function setting screen 72 and the page designation screen 75. When the close button 79 is operated on the initial mode setting screen 71, the initial mode setting screen 71 is closed. When the initial mode setting screen 71 is closed, the setting list screen 63 is displayed.

Figure 21:
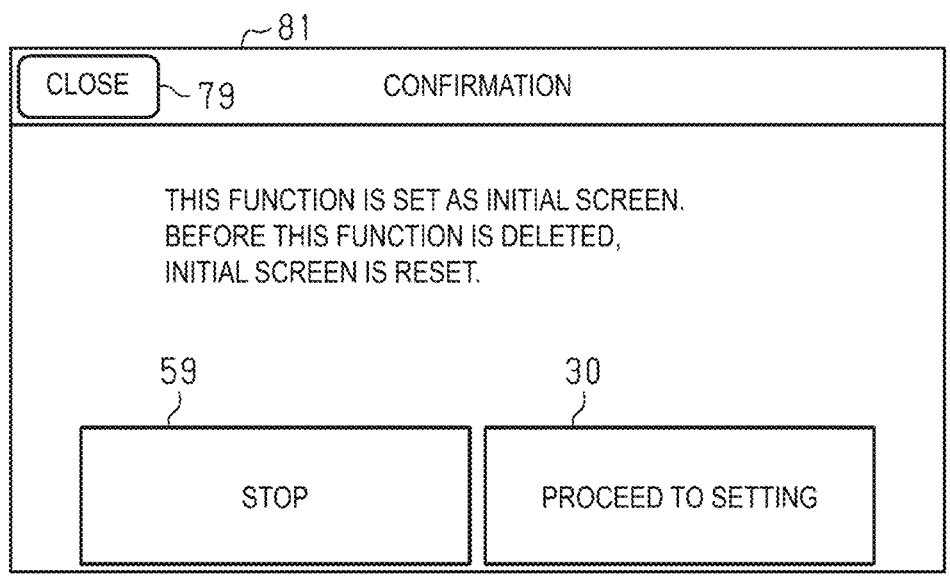
FIG. 21 is a schematic diagram of a deletion confirmation screen.

As illustrated in FIG. 21, the display unit 13 may display a deletion confirmation screen 81. The deletion confirmation screen 81 is displayed when a screen to be displayed as the initial screen is set based on the number of the job and the job is deleted. For example, the deletion confirmation screen 81 is displayed when the screen displayed as the initial screen is set based on the number of the processing function, and the processing function icon 24 corresponding to the number is deleted from the processing function selection screen 23. For example, the deletion confirmation screen 81 is displayed when the screen displayed as the initial screen is set based on the favorite number and the favorite label 42 corresponding to the number is deleted from the favorite selection screen 41.

A message for prompting resetting of the initial screen is displayed on the deletion confirmation screen 81. When a job indicating the number received by the control unit 17 is deleted on the initial mode setting screen 71, the page to be displayed as the initial screen is lost. Therefore, when the job indicated by the number received on the initial mode setting screen 71 is deleted from the selection screen, the control unit 17 prompts the resetting of the initial screen by causing the display unit 13 to display the deletion confirmation screen 81. When the processing function icon 24 indicated by the number received on the initial mode setting screen 71 is deleted from the processing function selection screen 23, the control unit 17 prompts the resetting of the initial screen. When the favorite label 42 indicated by the number received on the initial mode setting screen 71 is deleted from the favorite selection screen 41, the control unit 17 prompts the resetting of the initial screen.

The OK button 30 is displayed on the deletion confirmation screen 81. When the OK button 30 is operated on the deletion confirmation screen 81, a process regarding setting of the initial screen is performed. The stop button 59 may be displayed on the deletion confirmation screen 81. When the stop button 59 is operated on the deletion confirmation screen 81, deletion of the job is stopped. The close button 79 may be displayed on the deletion confirmation screen 81. When the close button 79 is operated on the deletion confirmation screen 81, the deletion confirmation screen 81 is closed. In this case, the job is deleted.

Figure 22:
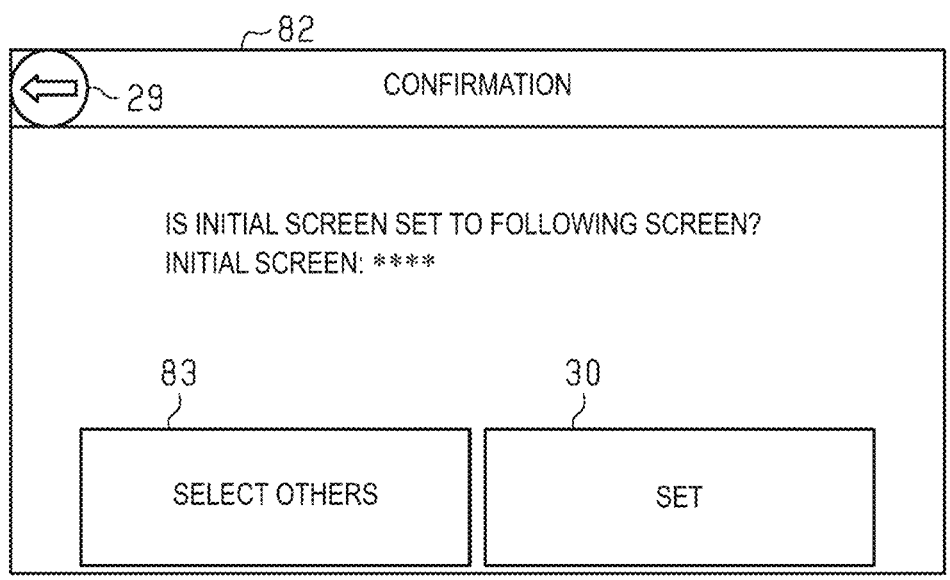
FIG. 22 is a schematic diagram of a resetting confirmation screen.

As illustrated in FIG. 22, the display unit 13 may display a resetting confirmation screen 82. In one example, the resetting confirmation screen 82 is displayed by the OK button 30 being operated on the deletion confirmation screen 81.

On the resetting confirmation screen 82, a message for asking the user whether or not a screen automatically determined by the control unit 17 may be set as the initial screen is displayed. When the screen to be displayed as the initial screen is set based on the number of the job and the job is deleted from the selection screen, the control unit 17 searches for candidates for a screen recommended when the initial screen is set. For example, when the screen displayed as the initial screen is set based on the number of the processing function and the processing function icon 24 corresponding to the number is deleted from the processing function selection screen 23, the control unit 17 searches for candidates for the screen. For example, when the screen displayed as the initial screen is set based on the number of the favorite, and the favorite label 42 corresponding to the number is deleted from the favorite selection screen 41, the control unit 17 searches for candidates for the screen.

The control unit 17 searches for a job in which a processing function common to the job to be deleted is set. More specifically, the control unit 17 searches for the job with a set processing function common to the job to be deleted, on the processing function selection screen 23 and the favorite selection screen 41. For example, when the favorite label 42 in which the scan to cloud function is set is deleted, the control unit 17 searches for the processing function icon 24 corresponding to the scan to cloud function and another favorite label 42 in which the scan to cloud function is set. The control unit 17 displays a selection screen, an execution screen, and the like on which the job with a set processing function common to the job to be deleted is displayed, as initial screen candidates on the resetting confirmation screen 82.

The OK button 30 is displayed on the resetting confirmation screen 82. When the OK button 30 is selected on the resetting confirmation screen 82, the screen automatically determined by the control unit 17 is set as the initial screen. The NO button 83 is displayed on the resetting confirmation screen 82. When the NO button 83 is selected on the resetting confirmation screen 82, the initial mode setting screen 71 is displayed. When the OK button 30 is selected on the deletion confirmation screen 81, for example, the initial mode setting screen 71 may be displayed, as well as the resetting confirmation screen 82 is displayed.

Figure 23:
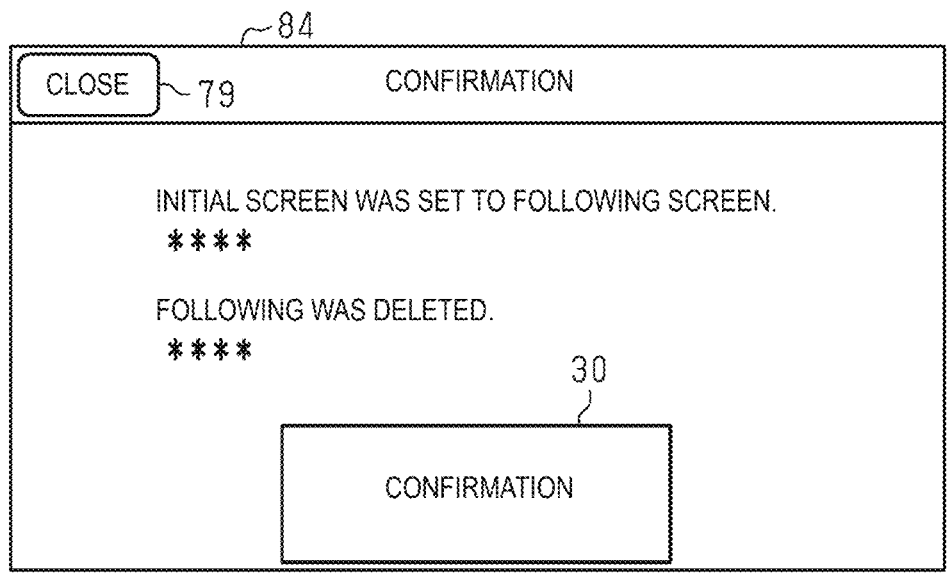
FIG. 23 is a schematic diagram of a resetting notification screen.

As illustrated in FIG. 23, the display unit 13 may display a resetting notification screen 84. On the resetting notification screen 84, a message for notifying the user that the screen automatically determined by the control unit 17 has been set as the initial screen is displayed. The resetting notification screen 84 is displayed by the OK button 30 being operated on the resetting confirmation screen 82.

A message for notifying that the job has been deleted may be displayed on the resetting notification screen 84. The OK button 30 may be displayed on the resetting notification screen 84. The close button 79 may be displayed on the resetting notification screen 84. When the OK button 30 or the close button 79 is selected on the resetting notification screen 84, the resetting notification screen 84 is closed.

When the screen displayed as the initial screen is set based on the number of the job and the job is deleted, the control unit 17 may cause the display unit 13 to display an error screen for prompting setting change for the initial screen instead of the deletion confirmation screen 81. The control unit 17 may cause transition to the processing function selection screen 23 after causing the error screen to be displayed. In this case, the job can be deleted after the setting of the initial screen is changed.

Figure 24:
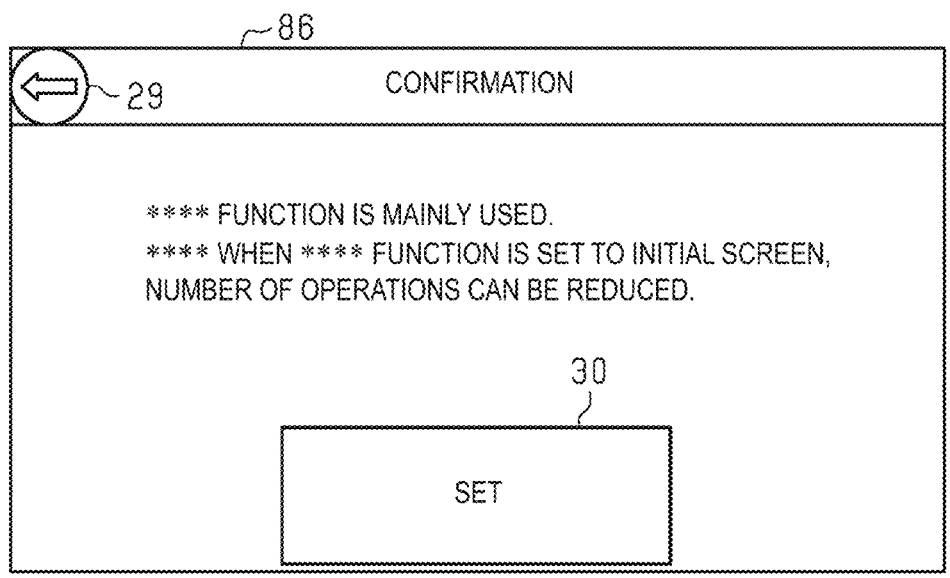
FIG. 24 is a schematic diagram of a setting recommendation screen.

As illustrated in FIG. 24, the display unit 13 may display a setting recommendation screen 86. The setting recommendation screen 86 is a screen for recommending settings of the initial screen based on the usage history of the user. For example, when the initial screen is not set, the control unit 17 may display the setting recommendation screen 86. For example, when there is a screen with a high use frequency than the screen set as the initial screen, the control unit 17 may display the setting recommendation screen 86. On the setting recommendation screen 86, a message indicating a processing function with a high use frequency may be displayed. This makes it possible for the user to ascertain the processing functions that the user often uses.

On the setting recommendation screen 86, a message for prompting setting, as the initial screen, a screen for facilitating selection of a processing function with a high use frequency among the plurality of processing functions may be displayed. For example, the control unit 17 may prompt to set the processing function execution screen 31 for executing the processing function with a high use frequency among the plurality of processing functions as the initial screen on the setting recommendation screen 86. For example, the control unit 17 may prompt to set the switching page 25 on which the processing function icon 24 indicating the processing function with a high use frequency among the plurality of processing functions is displayed, as the initial screen on the setting recommendation screen 86.

The OK button 30 is displayed on the setting recommendation screen 86. When the OK button 30 is operated on the setting recommendation screen 86, the screen recommended by the control unit 17 is set as the initial screen. The return button 29 may be displayed on the setting recommendation screen 86.

Figure 25:
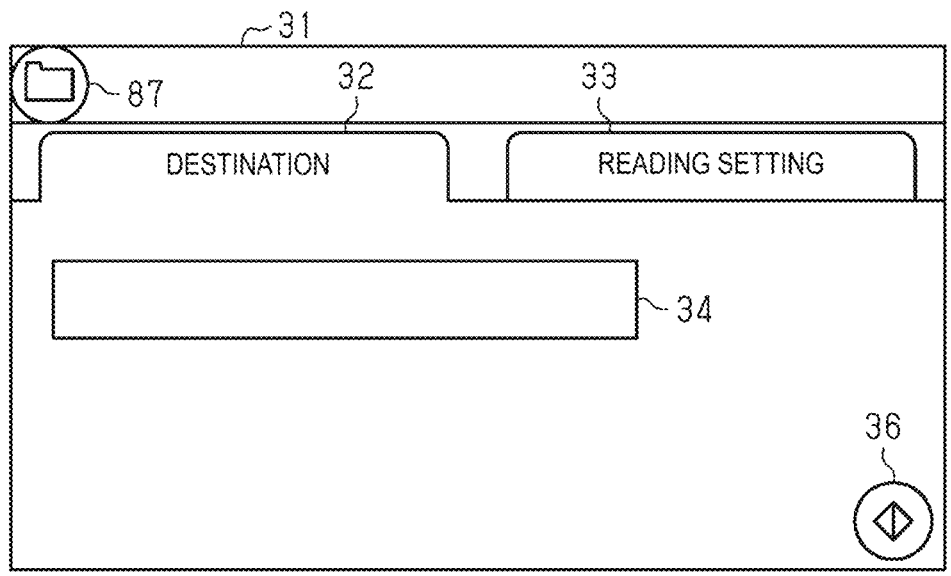
FIG. 25 is a schematic diagram of a processing function execution screen on which an initial screen icon is displayed.

As illustrated in FIG. 25, on the display unit 13, an initial screen icon 87 indicating that the initial screen is set may be displayed on the screen set as the initial screen. In the example illustrated in FIG. 25, the initial screen icon 87 is displayed on the processing function execution screen 31 set as the initial screen. The user can ascertain the screen set as the initial screen by viewing the initial screen icon 87.

Initial Screen Display Process

Next, an example of initial screen display process executed by the control unit 17 will be described. The control unit 17 executes the initial screen display process when the reading device 11 enters the standby state.

Figure 26:
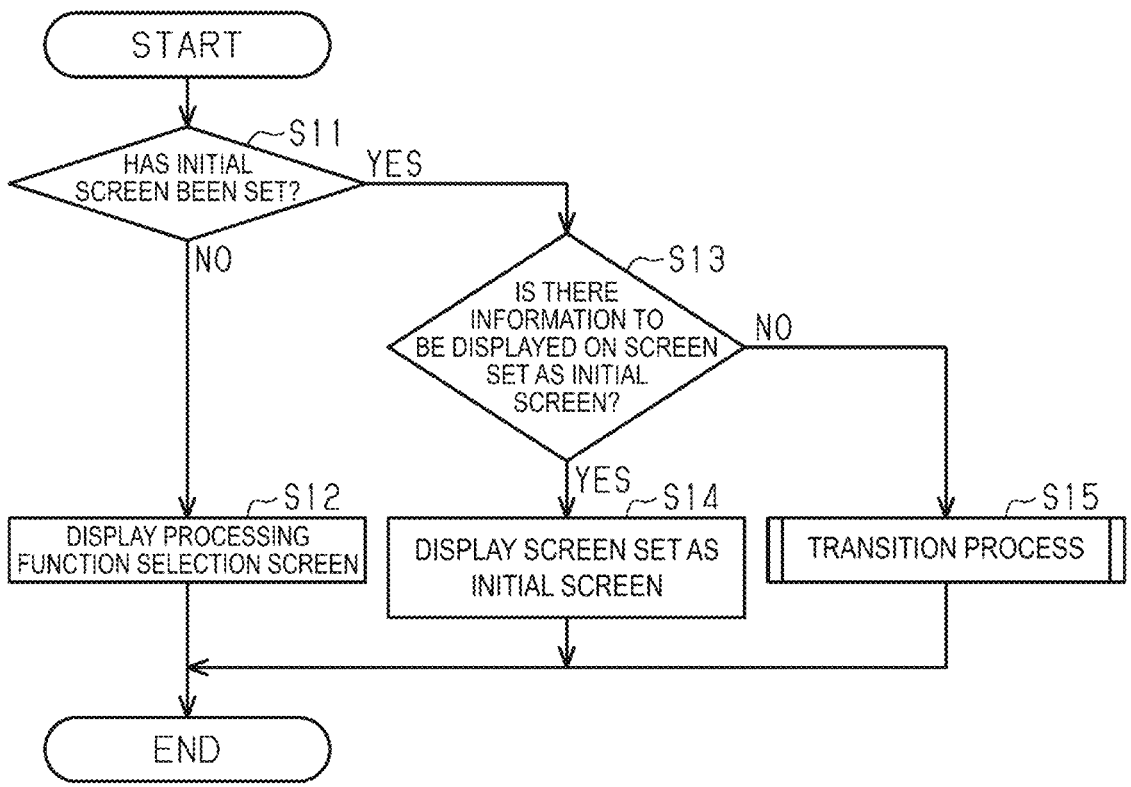
FIG. 26 is a flowchart illustrating an example of an initial screen display process.

As illustrated in FIG. 26, in step S11, the control unit 17 determines whether or not the initial screen is set. When the initial screen is not set, the control unit 17 proceeds to the process of step S12. When the initial screen is set, the control unit 17 proceeds to the process of step S13.

The control unit 17 displays the processing function selection screen 23 in step S12. The control unit 17 may display the first page of the processing function selection screen 23, or may display a page with a high use frequency. When the initial screen is not set, the control unit 17 displays the processing function selection screen 23 as the initial screen. After the control unit 17 ends the process of step S12, the control unit 17 ends the initial screen display process.

In step S13, the control unit 17 determines whether or not there is information to be displayed on the screen set as the initial screen. When there is information to be displayed on the screen set as the initial screen, the control unit 17 proceeds to the process of step S14. When there is no information to be displayed on the screen set as the initial screen, the control unit 17 proceeds to the process of step S15.

A case in which there is no information to be displayed on the screen set as the initial screen is a case in which no job is displayed on the screen set as the initial screen. For example, when the processing function selection screen 23 is set as the initial screen and no processing function icon 24 is displayed on the processing function selection screen 23, the control unit 17 proceeds to the process of step S15. For example, when the favorite selection screen 41 is set as the initial screen and no favorite label 42 is displayed on the favorite selection screen 41, the control unit 17 proceeds to the process of step S15.

The case in which there is no information to be displayed on the screen set as the initial screen is a case in which no job is displayed on the page indicated by the number received by the control unit 17. For example, when the processing function selection screen 23 is set as the initial screen based on the number of the switching page 25, and no processing function icon 24 is displayed on the switching page 25 indicated by the number, the control unit 17 proceeds to the process of step S15. For example, when the favorite selection screen 41 is set as the initial screen based on the number of the tab page 43, and no favorite label 42 is displayed on the tab page 43 indicated by the number, the control unit 17 proceeds to the process of step S15.

The case in which there is no information to be displayed on the screen set as the initial screen is a case in which the job indicated by the number received by the control unit 17 is not displayed on the selection screen. For example, when the processing function selection screen 23 is set as the initial screen based on the number of the processing function, and the processing function icon 24 indicated by the number is not displayed on the processing function selection screen 23, the control unit 17 proceeds to the process of step S15. For example, when the favorite selection screen 41 is set as the initial screen based on the favorite number, and the favorite label 42 indicated by the number is not displayed on the favorite selection screen 41, the control unit 17 proceeds to the process of step S15.

In step S14, the control unit 17 displays the screen set as the initial screen. After the control unit 17 ends the process of step S14, the control unit 17 ends the initial screen display process.

The control unit 17 executes a transition process in step S15. The transition process is a process for transitioning to another screen when there is no information to be displayed on the screen set as the initial screen. That is, the control unit 17 changes the screen displayed as the initial screen. This eliminates operations of the user required to switch from the screen set as the initial screen to another screen. After the control unit 17 ends the process of step S15, the control unit 17 ends the initial screen display process.

Figures 27, 28:
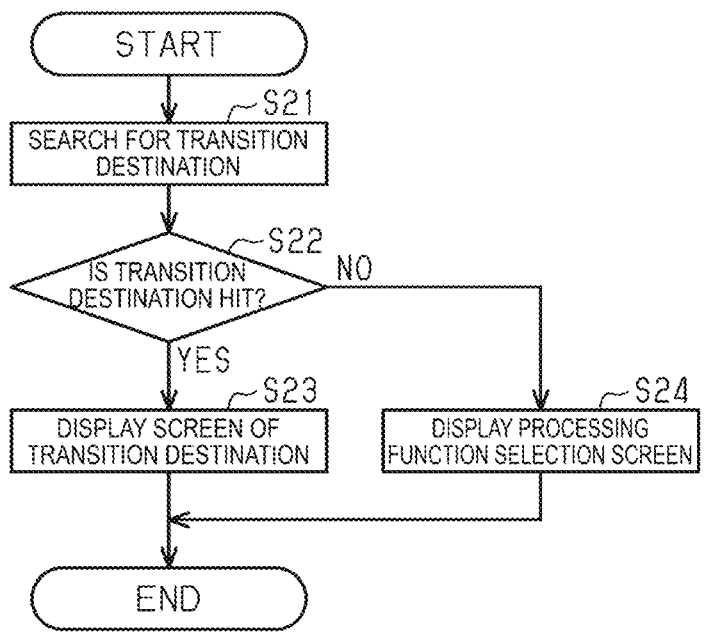
FIG. 27 is a flowchart illustrating an example of a transition process.
FIG. 28 is a table illustrating priority information.

As illustrated in FIG. 27, in step S21, the control unit 17 that executes the transition process searches for a transition destination of the initial screen. In step S21, the control unit 17 searches for candidates for a screen to be displayed instead of the screen set as the initial screen. In this case, the control unit 17 may determine the transition destination based on the processing function. The control unit 17 may determine the transition destination based on a priority of the processing function. The control unit 17 may determine the transition destination based on the position information and the priority. The control unit 17 may execute one of the three processes, may execute two of the three processes, or may execute all of the three processes.

When the control unit 17 determines the transition destination based on the processing function, the control unit 17 searches for a job using the same scheme as a case in which a candidate screen is displayed on the resetting confirmation screen 82. Therefore, a scheme of determining the transition destination based on the processing function is effective when the screen to be displayed as the initial screen is set based on the number of the job.

The control unit 17 searches for a job corresponding to a processing function common to a job with the number received for setting of the initial screen. For example, the control unit 17 determines, as the transition destination, the tab page 43 of the favorite selection screen 41 on which the favorite with the set processing function indicated by the number received on the initial mode setting screen 71 is displayed. For example, the control unit 17 determines, as the transition destination, the tab page 43 of the favorite selection screen 41 on which a favorite with the same set processing function as the favorite indicated by the number received on the initial mode setting screen 71 is displayed. For example, the control unit 17 determines, as the transition destination, the switching page 25 of the processing function selection screen 23 on which the same processing function as the favorite indicated by the number received on the initial mode setting screen 71 is displayed.

When the control unit 17 determines the transition destination based on the priority of the processing function, the control unit 17 confirms the priority information. The priority information is information indicating the priority of the plurality of processing functions. The priority information is stored by the control unit 17. The priority may be stored in the control unit 17 in advance, or may be arbitrarily set by the user from the operating unit 14 and the external device 99. The control unit 17 may be configured to be able to set priorities for the plurality of processing functions.

As illustrated in FIG. 28, the control unit 17 stores priority information. The priority information indicates a processing function that is preferentially selected from among the plurality of processing functions. In the example illustrated in FIG. 28, the priority information indicates that the scan to cloud function among the plurality of processing functions has a high priority. The priority information may indicate an order of processing functions with the high priority, as well as indicating the processing function with the highest priority.

The control unit 17 searches for a job corresponding to the processing function with a high priority among the plurality of processing functions by referring to the priority information. When a job corresponding to the processing function with a high priority is displayed, the control unit 17 determines, as the transition destination, the page of the selection screen on which the job is displayed. For example, the control unit 17 determines, as the transition destination, the switching page 25 of the processing function selection screen 23 on which the processing function icon 24 indicating the processing function with a high priority is displayed. For example, the control unit 17 determines, as the transition destination, the tab page 43 of the favorite selection screen 41 on which a favorite having a set processing function with a high priority is displayed. This makes it easier for the user to select the processing function with the high priority.

When the control unit 17 determines the transition destination based on the position information and the priority, the control unit 17 acquires the position information and then confirms the priority information. In this case, the control unit 17 stores the priority information in association with the position information.

As illustrated in FIG. 29, the control unit 17 stores priority information for each piece of position information. For example, the control unit 17 stores first priority information associated with first position information and second priority information associated with second position information. The control unit 17 acquires position information by the detection unit 15 detecting the positioning information. When the control unit 17 acquires the first position information, the control unit 17 refers to the first priority information. In the example illustrated in FIG. 29, in the first priority information, the scan to cloud function, the scan to drive function, and the scan to mail function have higher priority in this order. When the control unit 17 acquires the second position information, the control unit 17 refers to the second priority information. In the example illustrated in FIG. 29, in the second priority information, the scan to folder function, the scan to cloud function, the scan to mail function, and the scan to drive function have a higher priority in this order.

when the job corresponding to the processing function with a high priority is displayed on the selection screen, the control unit 17 determines the page of the selection screen on which the job is displayed as the transition destination, based on the position information. For example, the control unit 17 determines, as the transition destination, the switching page 25 of the processing function selection screen 23 on which the processing function icon 24 indicating the processing function with a high priority is displayed, based on the position information. For example, the control unit 17 determines, as the transition destination, the tab page 43 of the favorite selection screen 41 on which the favorite having a set processing function with a high priority is displayed, based on the position information.

In the example illustrated in FIG. 29, the first position information is information indicating that the reading device 11 is located in a residential area. The second position information is information indicating that the reading device 11 is located at a company. When the reading device 11 is located in a residential area, it is foreseen that the reading device 11 will be used by a small number of people. When the reading device 11 is located in a company, it is foreseen that the reading device 11 will be used by a large number of people. When the reading device 11 is used by a small number of people, it is convenient to use the reading device 11 when the destination is a cloud. When a large number of people use the reading device 11, it is convenient to use the reading device 11 when the destination is each folder. Thus, a user-friendly processing function may differ depending on a use aspect of the reading device 11. Therefore, it is possible to present the processing function according to the use aspect of the reading device 11 by changing the priority of the processing function based on the position information.

As illustrated in FIG. 27, in step S22, the control unit 17 determines whether or not there is the transition destination of the screen. When there is the transition destination, the control unit 17 proceeds to the process of step S23. When there is no transition destination, the control unit 17 proceeds to the process of step S24.

In step S23, the control unit 17 causes the display unit 13 to display, as the initial screen, the screen determined as the transition destination. For example, the control unit 17 causes the display unit 13 to display, as the initial screen, the tab page 43 of the favorite selection screen 41 on which the favorite with the same set processing function as the favorite indicated by the number received on the initial mode setting screen 71 is displayed. This makes it easy for the user to select the same processing function as the job to be displayed on the initial screen. For example, the control unit 17 causes the display unit 13 to display, as the initial screen, the tab page 43 of the favorite selection screen 41 on which the favorite having a set processing function with a high priority is displayed. This makes it easier for the user to select the processing function with the high priority.

In step S23, the control unit 17 may cause the display unit 13 to display a screen for notifying that the screen has transitioned to a screen different from the screen set as the initial screen. Further, the control unit 17 may cause the display unit 13 to display an error screen for prompting the resetting of the initial screen together with a screen that is the transition destination.

The control unit 17 causes the display unit 13 to display the processing function selection screen 23 in step S24. For example, the control unit 17 may cause the display unit 13 to display the processing function selection screen 23 as the initial screen when the job corresponding to a processing function common to the job with the number received for setting of the initial screen is not displayed. For example, the control unit 17 causes the display unit 13 to display the processing function selection screen 23 as the initial screen when the job corresponding to the processing function with a high priority is not displayed. The control unit 17 may cause the first page of the processing function selection screen 23 to be displayed, or may cause a page with a high use frequency to be displayed.

After the control unit 17 ends the process of step S23 or step S24, the control unit 17 ends the transition process. The control unit 17 ends the initial screen display process by ending the transition process. The control unit 17 may skip the transition process in the initial screen display process. In this case, the control unit 17 may cause the display unit 13 to display the processing function selection screen 23 as the initial screen without executing the transition process. In this case, the control unit 17 may cause the display unit 13 to display the error screen for prompting the resetting of the initial screen.

Operation and Effects

Next, operation and effects of the embodiment will be described.

(1) The control unit 17 receives a setting for displaying any one of the processing function selection screen 23, the processing function execution screen 31, and the favorite selection screen 41 as the initial screen on the initial mode setting screen 71. The control unit 17 causes the display unit 13 to display the screen received on the initial mode setting screen 71 as the initial screen.

According to the above configuration, the user can set a desired screen as the initial screen through the initial mode setting screen 71. That is, the user can set the content of the initial screen that is displayed in the standby state. This makes it possible for the user to quickly select a desired processing function, a desired favorite, or the like. Therefore, usability is improved.

(2) The control unit 17 receives a number of one of the plurality of tab pages 43 on the initial mode setting screen 71, and causes the display unit 13 to display the tab page 43 indicated by the number received on the initial mode setting screen 71 as the initial screen.

According to the above configuration, the user can designate the tab page 43 on which the desired favorite is displayed through the initial mode setting screen 71 to thereby set the tab page 43 as the initial screen. This reduces an effort of switching between the tab pages 43 to select the desired favorite from the favorite selection screen 41.

(3) When the control unit 17 receives the number of the tab page 43 to be displayed as the initial screen on the initial mode setting screen 71, and the favorite is not displayed on the tab page 43, the control unit 17 notifies the user that no favorite is displayed on the tab page 43. According to the above configuration, it is possible to reduce concern that the tab page 43 on which no favorites are displayed is set as the initial screen due to an error of the operation of the user.

(4) The control unit 17 causes the display unit 13 to display the processing function selection screen 23 as the initial screen when the tab page 43 on which no favorites are displayed is set as the initial screen.

When the tab page 43 on which no favorites are displayed is displayed as the initial screen, the user needs to call another screen to start the reading. Therefore, the number of operations required to start the reading increases. According to the above configuration, the user can select the desired function from the processing function selection screen 23 displayed as the initial screen. This reduces the number of operations.

(5) The control unit 17 receives the number of one of the plurality of favorites on the initial mode setting screen 71. The control unit 17 causes the display unit 13 to display, as the initial screen, a page on which the favorite indicated by the number received on the initial mode setting screen 71 is displayed.

According to the above configuration, the user can designate a desired favorite through the initial mode setting screen 71 to thereby set the page on which the favorite is displayed, as the initial screen. This reduces an effort of switching between the pages in order to select a desired favorite from the favorite selection screen 41.

(6) When the favorite indicated by the number received on the initial mode setting screen 71 is not displayed on the favorite selection screen 41, the control unit 17 causes the display unit 13 to display the processing function selection screen 23 as the initial screen.

When the favorite selection screen 41 in which the favorite indicated by the number received on the initial mode setting screen 71 is not registered is displayed as the initial screen, the user needs to call another screen to start the reading. Therefore, the number of operations required to start the reading increases. According to the above configuration, the user can select the desired function from the processing function selection screen 23 displayed as the initial screen. This reduces the number of operations.

(7) When the favorite indicated by the number received on the initial mode setting screen 71 is not displayed on the favorite selection screen 41, the control unit 17 causes the display unit 13 to display a page on which the favorite with the same set processing function as the favorite is displayed, as the initial screen.

According to the above configuration, the user can select a favorite with the same set processing function as the favorite designated on the initial mode setting screen 71, from the page displayed as the initial screen. This reduces the number of operations.

(8) The control unit 17 causes the display unit 13 to display a page on which a favorite for which the processing function with a high priority among the plurality of processing functions is set is displayed, as the initial screen when the favorite indicated by the number received on the initial mode setting screen 71 is not displayed on the favorite selection screen 41. According to the above configuration, the user can select the favorite having a set processing function with a high priority from the page displayed as the initial screen. This improves usability.

(9) The control unit 17 causes the display unit 13 to display a page on which a favorite for which the processing function with a high priority among the plurality of processing functions is set is displayed, as the initial screen, based on the position information, when the favorite indicated by the number received on the initial mode setting screen 71 is not displayed on the favorite selection screen 41.

A user-friendly processing function may be different depending on the use aspect of the reading device 11. For example, the user-friendly processing function may be different when the reading device 11 is used by a small number of people and a case in which the reading device 11 is used by a large number of people. According to the above configuration, the control unit 17 can ascertain whether the reading device 11 is installed in a residential area or installed in a company, based on the position information. When the reading device 11 is installed in the residential area, it can be foreseen that the reading device 11 will be used by a small number of people. When the reading device 11 is installed in the company, it can be foreseen that the reading device 11 will be used by a large number of people. Therefore, the control unit 17 can cause the page on which the favorite for which the processing function with a high priority is set is displayed to be displayed as the initial screen depending on a case in which the reading device 11 is used at home or a case in which the reading device 11 is used in a company, based on the position information. The user can select the favorite having a set processing function with a high priority from the page displayed as the initial screen based on position information. This improves usability.

(10) When the favorite indicated by the number received on the initial mode setting screen 71 is deleted from the favorite selection screen 41, the control unit 17 prompts the resetting of the initial screen.

According to the above configuration, concern that the favorite selection screen 41 on which the favorite indicated by the number received on the initial mode setting screen 71 is not displayed is displayed as the initial screen is reduced.

(11) The control unit 17 prompts setting the processing function execution screen 31 for executing a processing function with a high use frequency among the plurality of processing functions as the initial screen. According to the above configuration, usability is improved.

(12) The display unit 13 displays a setting button 27 for receiving a setting for displaying the processing function execution screen 31 as the initial screen on the processing function execution screen 31.

According to the above configuration, the currently displayed processing function execution screen 31 can be immediately set as the initial screen. Therefore, usability is improved.

(13) The control unit 17 receives a number of one page to be displayed as the initial screen among the plurality of pages on the initial mode setting screen 71. The control unit 17 causes the display unit 13 to display the page indicated by the number received on the initial mode setting screen 71 as the initial screen.

According to the above configuration, the user can designate the page on which the desired processing function is displayed through the initial mode setting screen 71 to set the page as the initial screen. This reduces an effort of switching between pages to select the desired processing function from the processing function selection screen 23.

(14) The control unit 17 receives the number of one of the plurality of processing functions on the initial mode setting screen 71. The control unit 17 causes the display unit 13 to display, as the initial screen, a page on which the processing function indicated by the number received on the initial mode setting screen 71 is displayed.

According to the above configuration, the user can designate the desired processing function through the initial mode setting screen 71 to thereby set the page on which the processing function is displayed, as the initial screen. This reduces an effort of switching between pages to select the desired processing function from the processing function selection screen 23.

(15) When the processing function indicated by the number received on the initial mode setting screen 71 is deleted from the processing function selection screen 23, the control unit 17 prompts the resetting of the initial screen.

According to the above configuration, concern that the page on which the processing function indicated by the number received on the initial mode setting screen 71 is not displayed is displayed as the initial screen is reduced.

(16) The control unit 17 receives a setting for displaying any one of the processing function selection screen 23, the processing function execution screen 31, and the favorite selection screen 41 as the initial screen on the initial mode setting screen 71 for each user. The control unit 17 causes the display unit 13 to display the screen received on the initial mode setting screen 71 as the initial screen for each user. According to the above configuration, the desired screen can be set as the initial screen for each user.

(17) The control unit 17 is configured to register the plurality of favorites for each user. The control unit 17 causes the display unit 13 to display the favorite selection screen 41 for each user.

According to the above configuration, since the favorite can be registered for each user, usability is improved.

(18) The control unit 17 causes the display unit 13 to display the identification information 18 indicating the user who is currently using the reading device 11.

According to the above configuration, other users can ascertain which user is using the reading device 11. This improves usability.

(19) The identification information is color.

According to the above configuration, since users are associated by color, it is easy to ascertain which user is using the reading device.

Technical Spirit

Hereinafter, technical spirit and effects ascertained from the above-described embodiments and modification examples will be described.

(A) A reading device is a reading device configured to register a reading setting as a favorite, the reading device including: a display unit, and a control unit configured to control the display unit, wherein the display unit is configured to display an initial mode setting screen for setting an initial screen displayed when the reading device enters a standby state in which an operation from a user is waited for, a processing function selection screen on which a plurality of processing functions are displayed, a processing function execution screen for executing one of the plurality of processing functions, a favorite selection screen on which a plurality of favorites are displayed, and the control unit receives a setting for displaying any one of the processing function selection screen, the processing function execution screen, and the favorite selection screen as the initial screen on the initial mode setting screen, and causes the display unit to display the screen received on the initial mode setting screen as the initial screen.

According to the above configuration, the user can set a desired screen as the initial screen through the initial mode setting screen. That is, the user can set the content of the initial screen that is displayed in the standby state. This makes it possible for the user to quickly select a desired processing function, a desired favorite, or the like. Therefore, usability is improved.

(B) In the reading device, the favorite selection screen may include a plurality of tab pages each displaying one or more of the plurality of favorites, and the control unit may receive a number of one of the plurality of tab pages on the initial mode setting screen, and cause the display unit to display the tab page indicated by the number received on the initial mode setting screen as the initial screen.

According to the above configuration, the user can designate a tab page on which the desired favorite is displayed through the initial mode setting screen to thereby set the tab page as the initial screen. This reduces an effort of switching between the pages in order to select a desired favorite from the favorite selection screen.

(C) In the reading device, when the number of the tab page to be displayed as the initial screen is received on the initial mode setting screen, the control unit may notify the user that the favorite is not displayed on the tab page when the favorite is not displayed on the tab page. According to the above configuration, it is possible to reduce concern that the tab page on which no favorites are displayed is set as the initial screen due to an error of the operation of the user.

(D) In the reading device, the control unit may cause the display unit to display the processing function selection screen as the initial screen when the tab page on which the favorite is not displayed is set as the initial screen.

When the tab page on which no favorites are displayed is displayed as the initial screen, the user needs to call another screen to start the reading. Therefore, the number of operations required to start the reading increases. According to the above configuration, the user can select the desired function from the processing function selection screen displayed as the initial screen. This reduces the number of operations.

(E) In the reading device, the favorite selection screen may include a plurality of pages each displaying one or more of the plurality of favorites, and the control unit may receive a number of one of the plurality of favorites on the initial mode setting screen, and cause the display unit to display the page on which the favorite indicated by the number received on the initial mode setting screen is displayed, as the initial screen.

According to the above configuration, the user can designate a desired favorite through the initial mode setting screen to thereby set the page on which the favorite is displayed, as the initial screen. This reduces an effort of switching between the pages in order to select a desired favorite from the favorite selection screen.

(F) In the reading device, when the favorite indicated by the number received on the initial mode setting screen is not displayed on the favorite selection screen, the control unit may cause the display unit to display the processing function selection screen as the initial screen.

When the favorite selection screen in which the favorite indicated by the number received on the initial mode setting screen is not registered is displayed as the initial screen, the user needs to call another screen to start the reading. Therefore, the number of operations required to start the reading increases. According to the above configuration, the user can select the desired function from the processing function selection screen displayed as the initial screen. This reduces the number of operations.

(G) In the reading device, the reading setting may include information indicating one processing function to be used among the plurality of processing functions, and the control unit may cause the display unit to display the page on which a favorite with the same set processing function as the favorite is displayed, as the initial screen when the favorite indicated by the number received on the initial mode setting screen is not displayed on the favorite selection screen.

According to the above configuration, the user can select a favorite with the same set processing function as the favorite designated on the initial mode setting screen, from the page displayed as the initial screen. This reduces the number of operations.

(H) In the reading device, the reading setting may include information indicating one processing function to be used among the plurality of processing functions, and the control unit may be configured to be able to set priorities for the plurality of processing functions, and cause the display unit to display a page on which a favorite for which the processing function with a high priority among the plurality of processing functions is set is displayed, as the initial screen when the favorite indicated by the number received on the initial mode setting screen is not displayed on the favorite selection screen. According to the above configuration, the user can the favorite having a set processing function with a high priority from the page displayed as the initial screen. This improves usability.

(I) In the reading device, the reading setting may include information indicating one processing function to be used among the plurality of processing functions, and the control unit may acquire position information at which the reading device is located, store priority information indicating priority regarding the plurality of processing functions in association with the position information, and cause the display unit to display a page on which a favorite for which the processing function with a high priority among the plurality of processing functions is set is displayed, as the initial screen, based on the position information when the favorite indicated by the number received on the initial mode setting screen is not displayed on the favorite selection screen.

A user-friendly processing function may be different depending on a use aspect of the reading device. For example, the user-friendly processing function may be different when the reading device is used by a small number of people and a case in which the reading device is used by a large number of people. According to the above configuration, the control unit can ascertain whether the reading device is installed in a residential area or installed in a company, based on the position information. When the reading device is installed in the residential area, it can be foreseen that the reading device will be used by a small number of people. When the reading device is installed in the company, it can be foreseen that the reading device will be used by a large number of people. Therefore, the control unit can cause the page on which the favorite for which the processing function with a high priority is set is displayed to be displayed as the initial screen depending on a case in which the reading device is used at home or a case in which the reading device is used in a company, based on the position information. The user can select the favorite having a set processing function with a high priority from the page displayed as the initial screen based on position information. This improves usability.

(J) In the reading device, when the favorite indicated by the number received on the initial mode setting screen is deleted from the favorite selection screen, the control unit may prompt resetting of the initial screen. According to the above configuration, concern that the favorite selection screen on which the favorite indicated by the number received on the initial mode setting screen is not displayed is displayed as the initial screen is reduced.

(K) In the reading device, the control unit may prompt setting, as the initial screen, the processing function execution screen for executing the processing function with a high use frequency among the plurality of processing functions. According to the above configuration, usability is improved.

(L) In the reading device, the display unit may display a setting button for receiving a setting for displaying the processing function execution screen as the initial screen on the processing function execution screen. According to the above configuration, the currently displayed processing function execution screen can be immediately set as the initial screen. Therefore, usability is improved.

(M) In the reading device, the processing function selection screen may include a plurality of pages each displaying one or more of the plurality of processing functions, and the control unit may receive, on the initial mode setting screen, a number of one page to be displayed as the initial screen among the plurality of pages, and cause the display unit to display the page indicated by the number received on the initial mode setting screen as the initial screen.

According to the above configuration, the user can designate the page on which the desired processing function is displayed through the initial mode setting screen to set the page as the initial screen. This reduces an effort of switching between the pages to select the desired processing function from the processing function selection screen.

(N) In the reading device, the processing function selection screen may include a plurality of pages each displaying one or more of the plurality of processing functions, and the control unit may receive a number of one of the plurality of processing functions on the initial mode setting screen, and cause the display unit to display the page on which the processing function indicated by the number received on the initial mode setting screen is displayed, as the initial screen.

According to the above configuration, the user can designate the desired processing function through the initial mode setting screen to thereby set the page on which the processing function is displayed, as the initial screen. This reduces an effort of switching between the pages to select the desired processing function from the processing function selection screen.

(O) In the reading device, when the processing function indicated by the number received on the initial mode setting screen is deleted from the processing function selection screen, the control unit may prompt resetting of the initial screen. According to the above configuration, concern that the page on which the processing function indicated by the number received on the initial mode setting screen is not displayed is displayed as the initial screen is reduced.

(P) In the reading device, the control unit may be configured to be able to identify a user who uses the reading device, receive a setting for displaying any one of the processing function selection screen, the processing function execution screen, and the favorite selection screen as the initial screen on the initial mode setting screen for each user, and cause the display unit to display a screen received on the initial mode setting screen as the initial screen for each user. According to the above configuration, the desired screen can be set as the initial screen for each user.

(Q) In the reading device, the control unit may be configured to be able to register the plurality of favorites for each user, and cause the display unit to display the favorite selection screen for each user. According to the above configuration, since the favorite can be registered for each user, usability is improved.

(R) In the reading device, the control unit may store identification information indicating the user by identifying the user, and cause the display unit to display the identification information indicating a user currently using the reading device. According to the above configuration, other users can ascertain which user is using the reading device. This improves usability.

(S) In the reading device, the identification information may be color.

According to the above configuration, since users are associated by color, it is easy to ascertain which user is using the reading device.

(T) A control method for a reading device is a control method for a reading device configured to register a reading setting as a favorite, the control method for a reading device including: receiving a setting for displaying, as an initial screen, any one of a processing function selection screen displaying a plurality of processing functions, a processing function execution screen for executing one of the plurality of processing functions, and a favorite selection screen displaying a plurality of favorites, in an initial mode setting screen on which the initial screen displayed when the reading device enters a standby state in which an operation is received from a user is set, and displaying the screen received on the initial mode setting screen as the initial screen. According to the above method, the same effects as those of the reading device described above can be obtained.

What is claimed is:

1. A reading device configured to register a reading setting as a favorite, the reading device comprising:
a display unit; and
a control unit configured to control the display unit,
wherein the display unit is configured to display an initial mode setting screen for setting an initial screen displayed when the reading device enters a standby state in which an operation from a user is waited for,
a processing function selection screen on which a plurality of processing functions are displayed,
a processing function execution screen for executing one of the plurality of processing functions, and
a favorite selection screen on which a plurality of favorites are displayed, and the control unit
receives a setting for displaying any one of the processing function selection screen, the processing function execution screen, and the favorite selection screen as the initial screen on the initial mode setting screen, and
causes the display unit to display the screen received on the initial mode setting screen as the initial screen,
the favorite selection screen includes a plurality of pages each displaying one or more of the plurality of favorites, and
the control unit
receives a number of one of the plurality of favorites on the initial mode setting screen, and
causes the display unit to display the page on which the favorite indicated by the number received on the initial mode setting screen is displayed, as the initial screen.

2. The reading device according to claim 1,
wherein, when the favorite indicated by the number received on the initial mode setting screen is not displayed on the favorite selection screen, the control unit causes the display unit to display the processing function selection screen as the initial screen.

3. The reading device according to claim 1,
wherein the reading setting includes information indicating one processing function to be used among the plurality of processing functions, and
the control unit causes the display unit to display the page on which a favorite with the same set processing function as the favorite is displayed as the initial screen, when the favorite indicated by the number received on the initial mode setting screen is not displayed on the favorite selection screen.

4. The reading device according to claim 1,
wherein the reading setting includes information indicating one processing function to be used among the plurality of processing functions, and
the control unit
is configured to set priorities for the plurality of processing functions, and
causes the display unit to display a page on which a favorite for which the processing function with a high priority among the plurality of processing functions is set is displayed, as the initial screen when the favorite indicated by the number received on the initial mode setting screen is not displayed on the favorite selection screen.

5. The reading device according to claim 1,
wherein the reading setting includes information indicating one processing function to be used among the plurality of processing functions, and
the control unit
acquires position information at which the reading device is located,
stores priority information indicating a priority regarding the plurality of processing functions in association with the position information, and
causes the display unit to display a page on which a favorite for which a processing function with a high priority among the plurality of processing functions is set is displayed, as the initial screen, based on the position information when the favorite indicated by the number received on the initial mode setting screen is not displayed on the favorite selection screen.

6. The reading device according to claim 1, wherein, when the favorite indicated by the number received on the initial mode setting screen is deleted from the favorite selection screen, the control unit prompts resetting of the initial screen.

7. The reading device according to claim 1,
wherein the control unit prompts setting, as the initial screen, the processing function execution screen for executing the processing function with a high use frequency among the plurality of processing functions.

8. The reading device according to claim 1,
wherein the display unit displays a setting button for receiving a setting for displaying the processing function execution screen as the initial screen on the processing function execution screen.

9. The reading device according to claim 1,
wherein the processing function selection screen includes a plurality of pages each displaying one or more of the plurality of processing functions, and
the control unit
receives, on the initial mode setting screen, a number of one page to be displayed as the initial screen among the plurality of pages, and
causes the display unit to display the page indicated by the number received on the initial mode setting screen as the initial screen.

10. The reading device according to claim 1,
wherein the processing function selection screen includes a plurality of pages each displaying one or more of the plurality of processing functions, and
the control unit
receives a number of one of the plurality of processing functions on the initial mode setting screen, and
causes the display unit to display the page on which the processing function indicated by the number received on the initial mode setting screen is displayed, as the initial screen.

11. The reading device according to claim 10, wherein, when the processing function indicated by the number received on the initial mode setting screen is deleted from the processing function selection screen, the control unit prompts resetting of the initial screen.

12. The reading device according to claim 1,
wherein the control unit
is configured to identify a user who uses the reading device,
receives a setting for displaying any one of the processing function selection screen, the processing function execution screen, and the favorite selection screen as the initial screen on the initial mode setting screen for each user, and
causes the display unit to display a screen received on the initial mode setting screen as the initial screen for each user.

13. The reading device according to claim 12, wherein
the control unit
is configured to register a plurality of favorites for each user, and causes the display unit to display the favorite selection screen for each user.

14. The reading device according to claim 1,
wherein the control unit
stores identification information indicating the user by identifying the user, and
causes the display unit to display the identification information indicating a user currently using the reading device.

15. The reading device according to claim 14, wherein the identification information is a color.

16. A reading device configured to register a reading setting as a favorite, the reading device comprising:
a display unit; and
a control unit configured to control the display unit,
wherein the display unit is configured to display
an initial mode setting screen for setting an initial screen displayed when the reading device enters a standby state in which an operation from a user is waited for,
a processing function selection screen on which a plurality of processing functions are displayed,
a processing function execution screen for executing one of the plurality of processing functions, and
a favorite selection screen on which a plurality of favorites are displayed, the control unit
receives a setting for displaying any one of the processing function selection screen, the processing function execution screen, and the favorite selection screen as the initial screen on the initial mode setting screen, and
causes the display unit to display the screen received on the initial mode setting screen as the initial screen,
the processing function selection screen includes a plurality of pages each displaying one or more of the plurality of processing functions, and
the control unit
receives a number of one of the plurality of processing functions on the initial mode setting screen, and
causes the display unit to display the page on which the processing function indicated by the number received on the initial mode setting screen is displayed, as the initial screen.

17. The reading device according to claim 16, wherein
the favorite selection screen includes a plurality of tab pages each displaying one or more of the plurality of favorites,
the control unit
receives a number of one of the plurality of tab pages on the initial mode setting screen,
causes the display unit to display the tab page indicated by the number received on the initial mode setting screen as the initial screen, and
when the number of the tab page to be displayed as the initial screen is received on the initial mode setting screen, notifies the user that the favorite is not displayed on the tab page when the favorite is not displayed on the tab page.

18. The reading device according to claim 16, wherein
the favorite selection screen includes a plurality of pages each displaying one or more of the plurality of favorites, and
the control unit
receives a number of one of the plurality of favorites on the initial mode setting screen,
causes the display unit to display the page on which the favorite indicated by the number received on the initial mode setting screen is displayed, as the initial screen, and
when the favorite indicated by the number received on the initial mode setting screen is not displayed on the favorite selection screen, causes the display unit to display the processing function selection screen as the initial screen.

19. The reading device according to claim 16, wherein
the control unit prompts setting, as the initial screen, the processing function execution screen for executing the processing function with a high use frequency among the plurality of processing functions.

20. The reading device according to claim 16, wherein
the display unit displays a setting button for receiving a setting for displaying the processing function execution screen as the initial screen on the processing function execution screen.

21. The reading device according to claim 16, wherein,
when the processing function indicated by the number received on the initial mode setting screen is deleted from the processing function selection screen, the control unit prompts resetting of the initial screen.

* * * * *